United States Patent [19]
Gates et al.

[11] 3,750,303
[45] Aug. 7, 1973

[54] STEAM TUNNELS FOR TREATING LOGS AND METHOD OF TREATMENT

[75] Inventors: Thomas W. Gates; Lesley R. Gates, Vayne R. Davis, all of Gainesville, Fla.

[73] Assignee: Thomas E. Gates & Sons, Inc., Gainesville, Fla.

[22] Filed: July 9, 1971

[21] Appl. No.: 161,256

[52] U.S. Cl. .................................... 34/9.5, 34/201
[51] Int. Cl. ............................................ F26b 3/00
[58] Field of Search .................... 34/9.5, 13.4, 13.8, 34/201

[56] References Cited
UNITED STATES PATENTS

| | | | |
|---|---|---|---|
| 2,892,261 | 6/1959 | Hutchinson | 34/9.5 |
| 2,464,429 | 3/1949 | Barksdale | 34/9.5 |
| 3,545,094 | 12/1970 | Schvette et al. | 34/13.4 |
| 1,519,287 | 12/1924 | Woodson | 34/201 |

*Primary Examiner*—John J. Camby
*Attorney*—Harry W. F. Glemser

[57] ABSTRACT

Apparatus and method for uniformly heating and saturating logs or wood "blocks" in one or more tunnels to condition the same to be peeled into veneer. The tunnel has a conveyor for moving blocks therethrough in a single layer, and has steam nozzels above and below the path of travel of the blocks for subjecting the blocks to highly saturated steam while they are in the tunnel. The tunnel is divided into four zones, each having its own independent automatic control system for providing a prescribed heating and saturating treatment. The speed of the conveyor and the heating cycle are coordinated with the demand of the cutting lathe for continuous operation. An in-feed conveyor, including a "kicker" device, supplies blocks to a crowder conveyor, which crowds the blocks against each other ahead of the entrance to the tunnel. A transfer conveyor at the tunnel exit receives the treated blocks from a "stop and loader" device, which transfers the blocks from the tunnel conveyor to the transfer conveyor. Another "kicker" device kicks the block off the transfer conveyor onto a lathe in-feed deck to supply a lathe charger. Control means, which may be either manual or automatic, regulates the discharge of blocks from the tunnel and delivery thereof to the charger in-feed deck. Under automatic control, the lathe charger, in positioning a block in the lathe, operates a limit switch that effects the discharge of a block from the tunnel.

44 Claims, 31 Drawing Figures

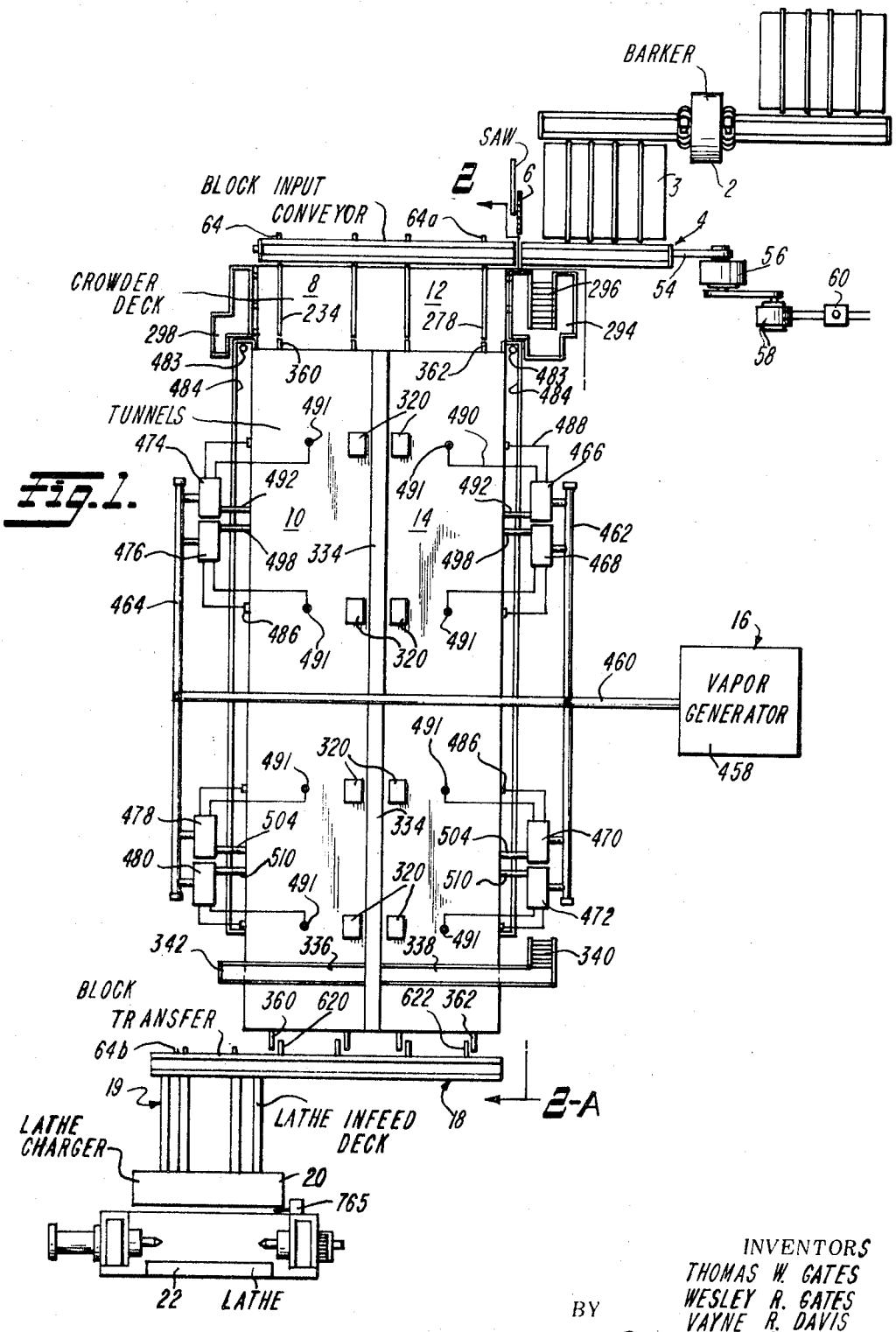

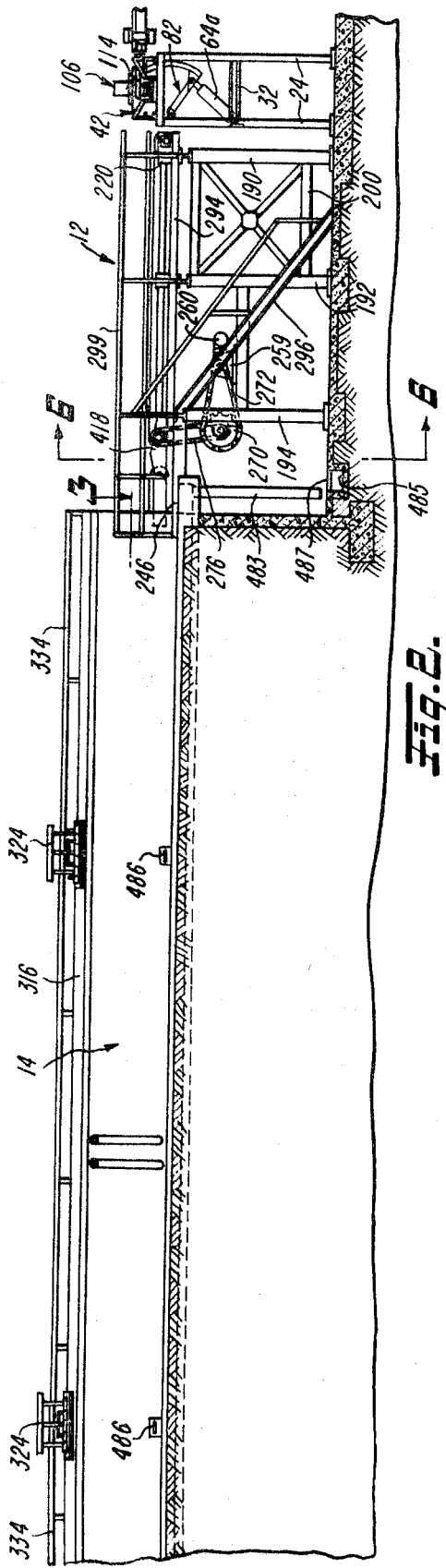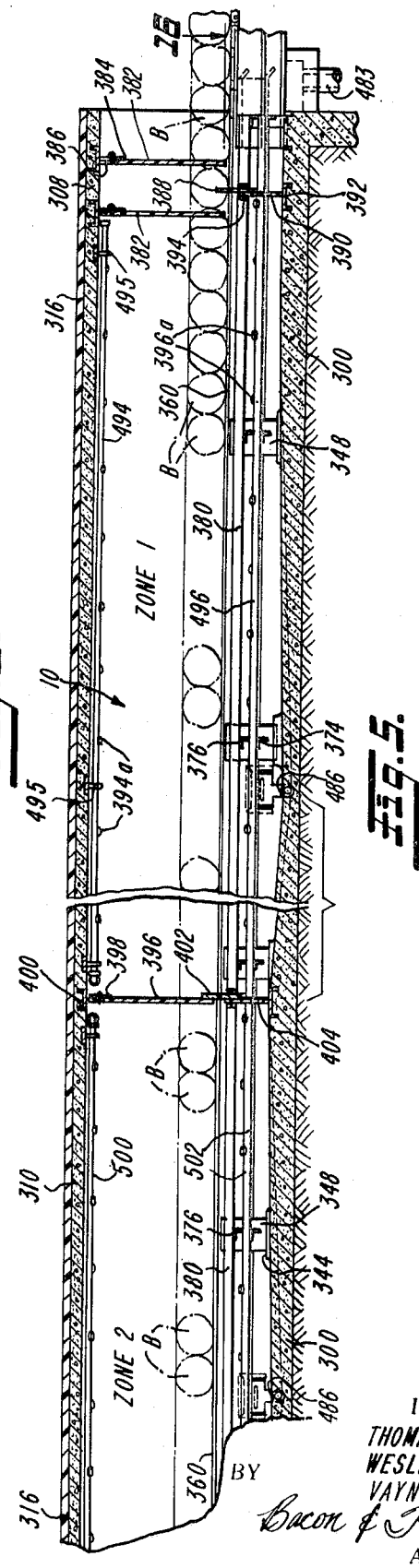

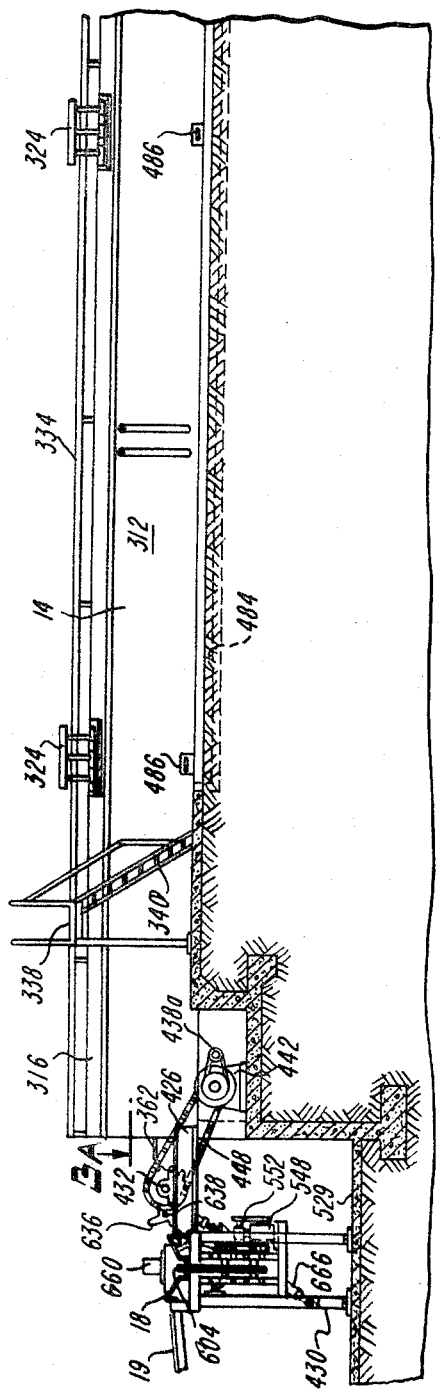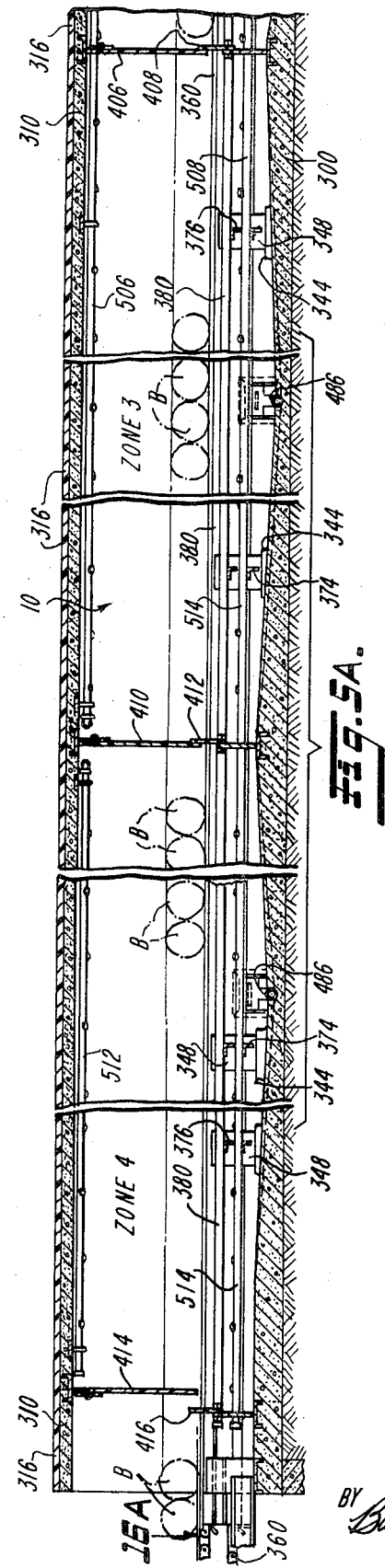

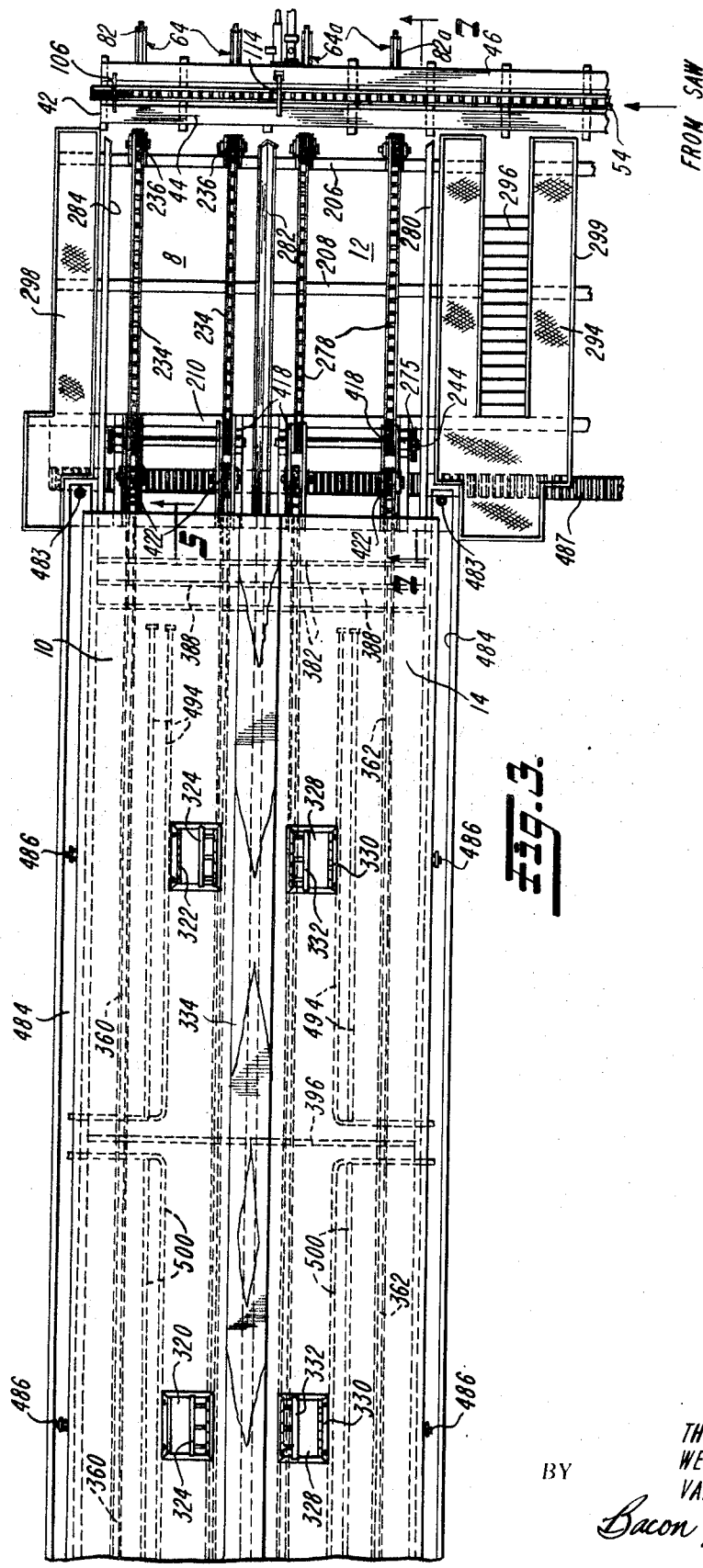

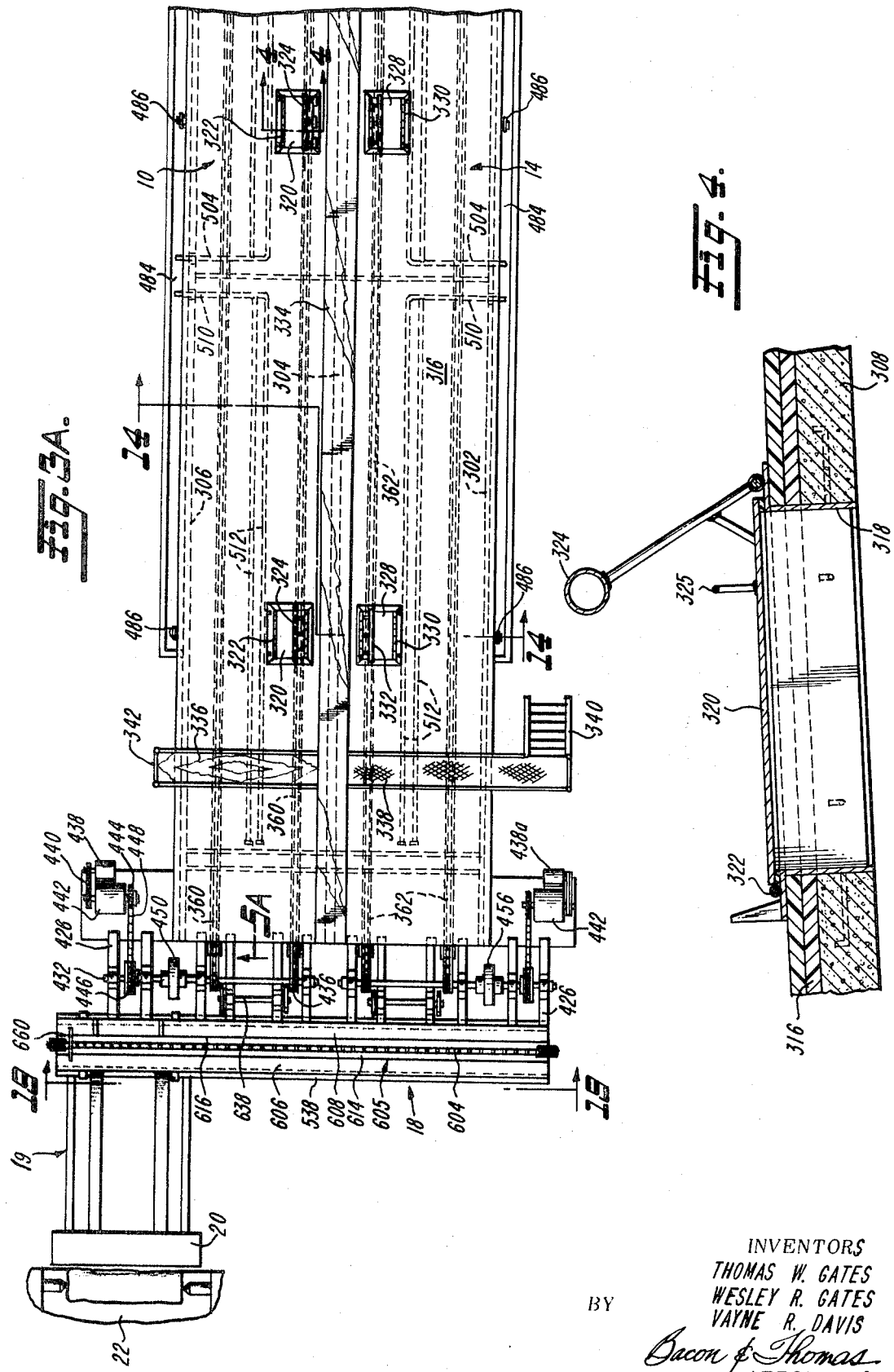

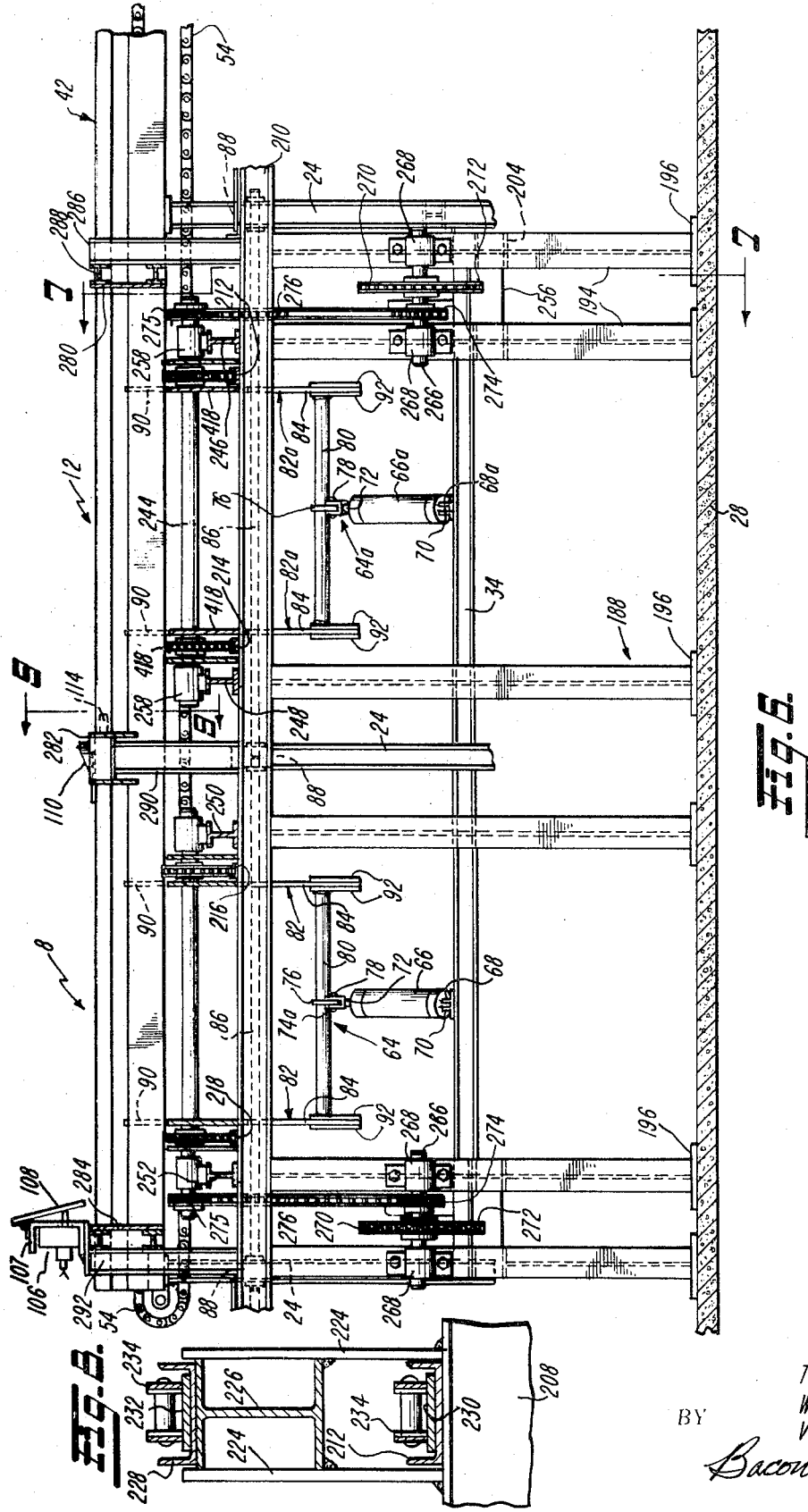

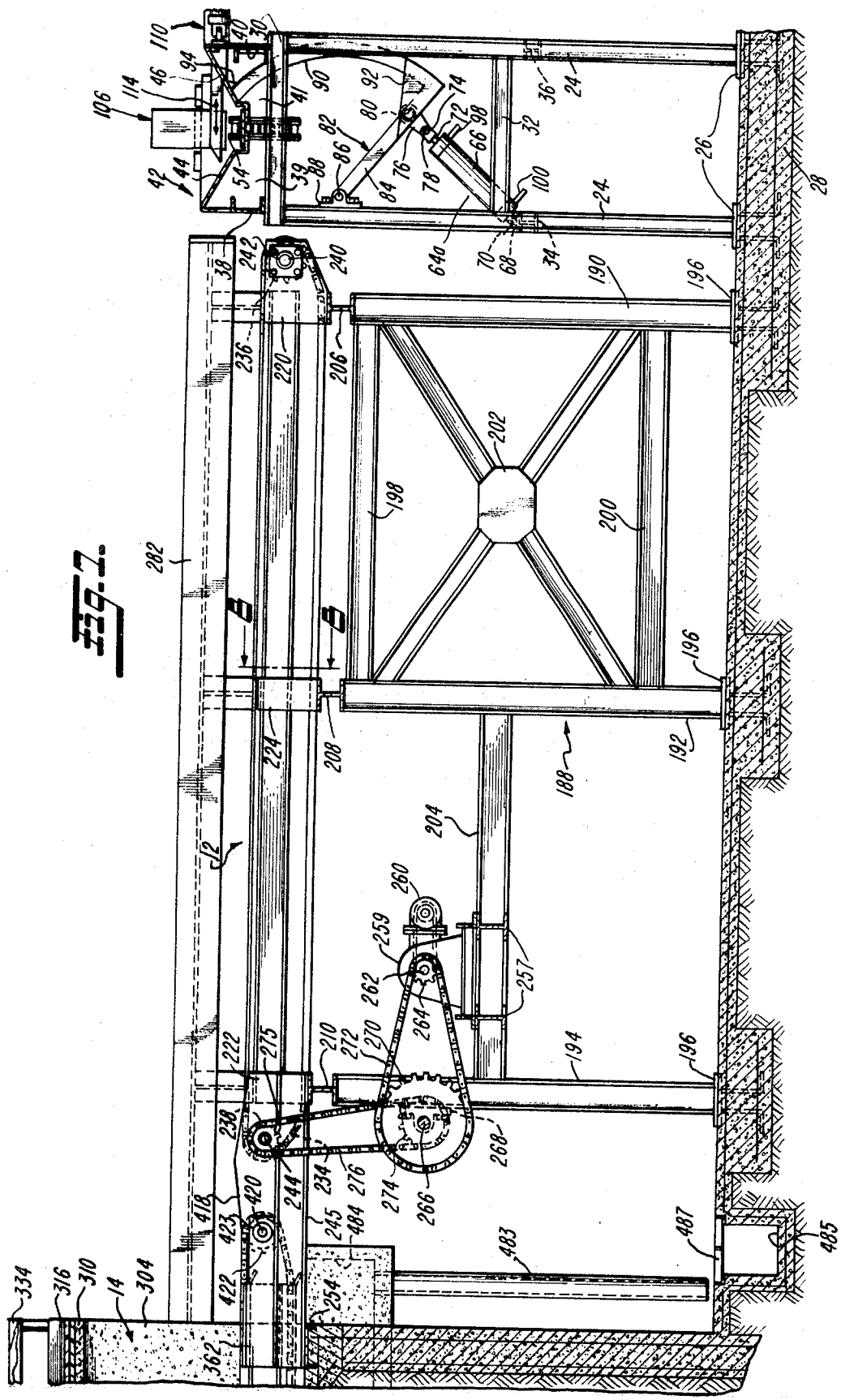

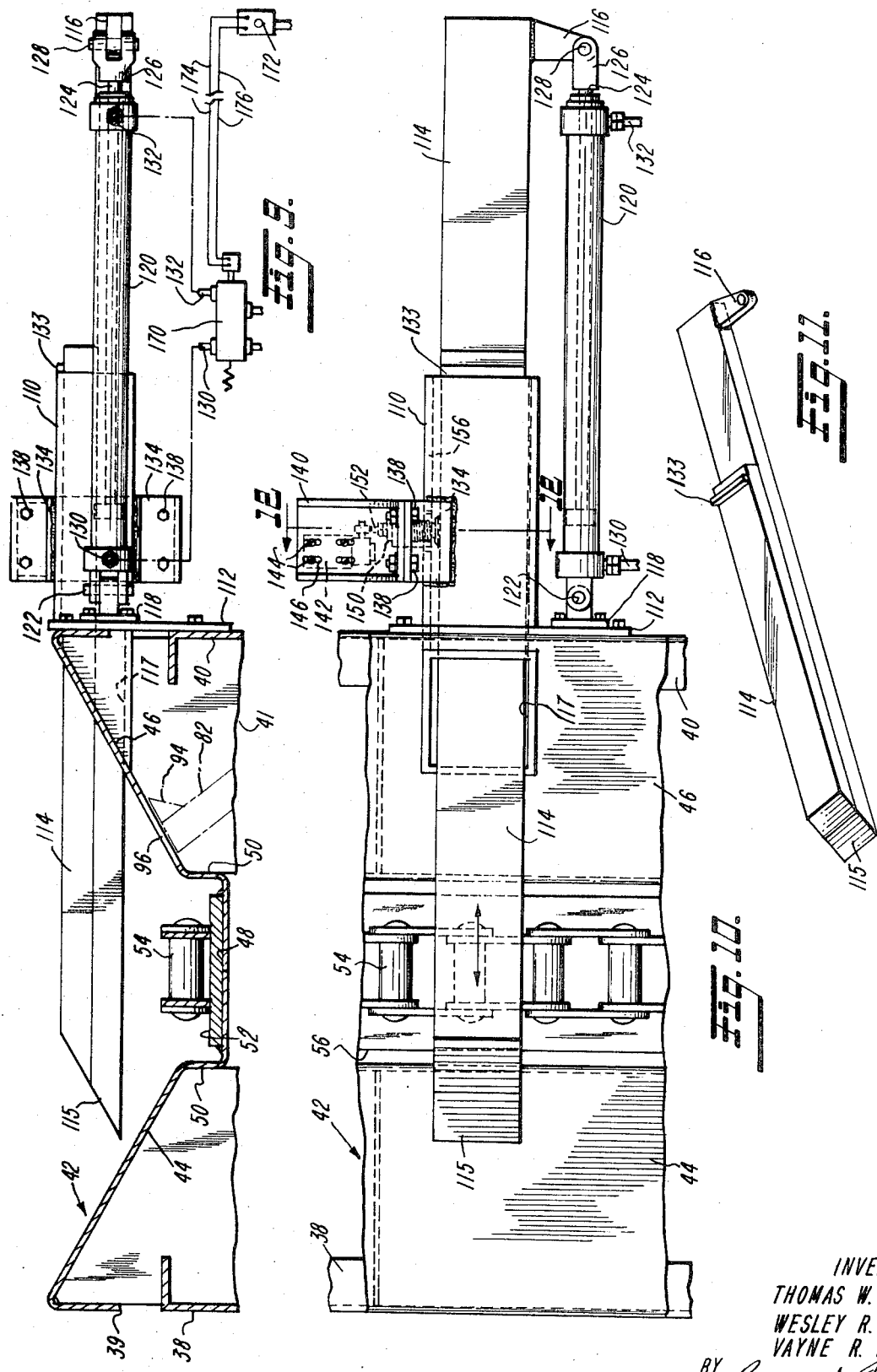

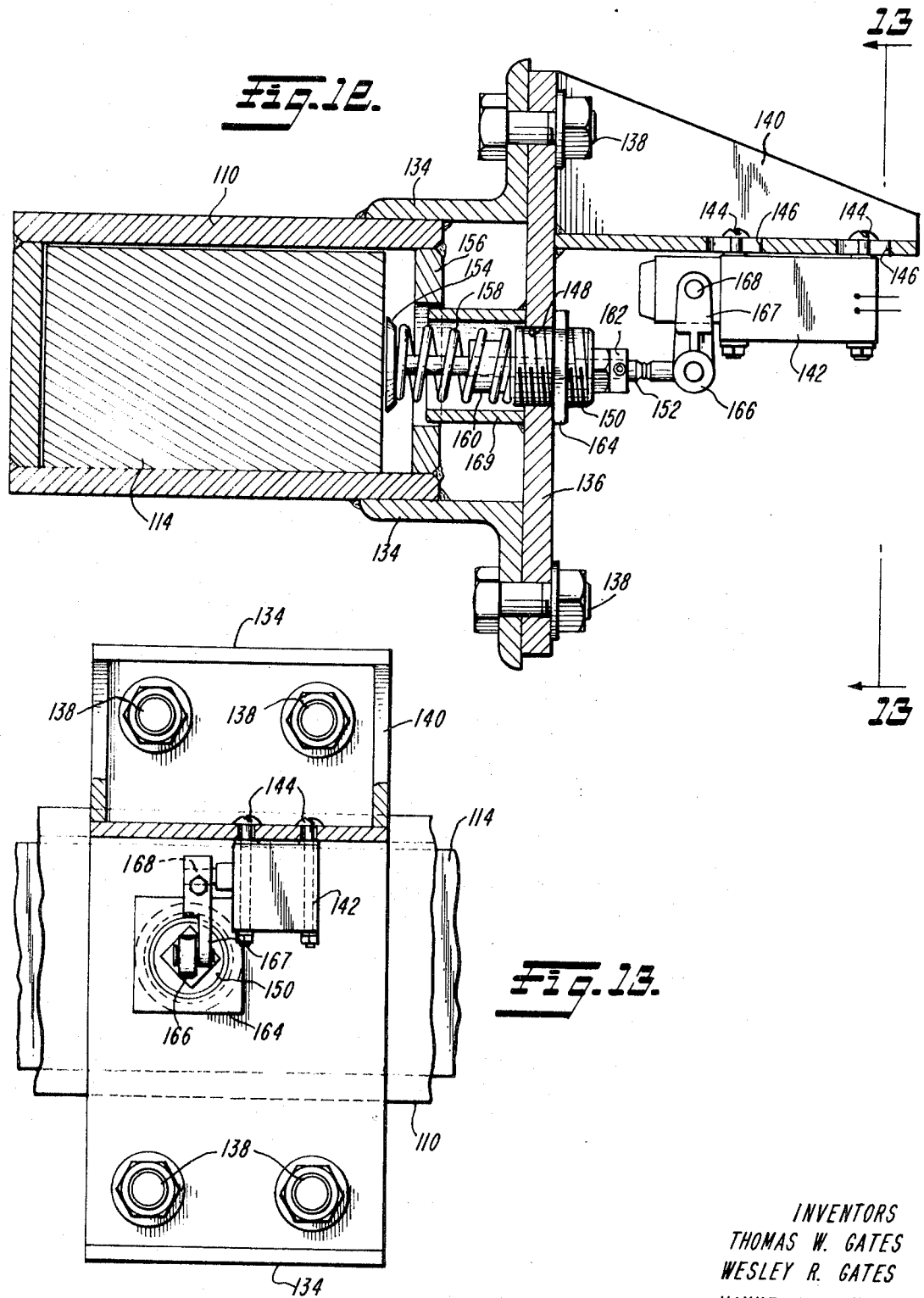

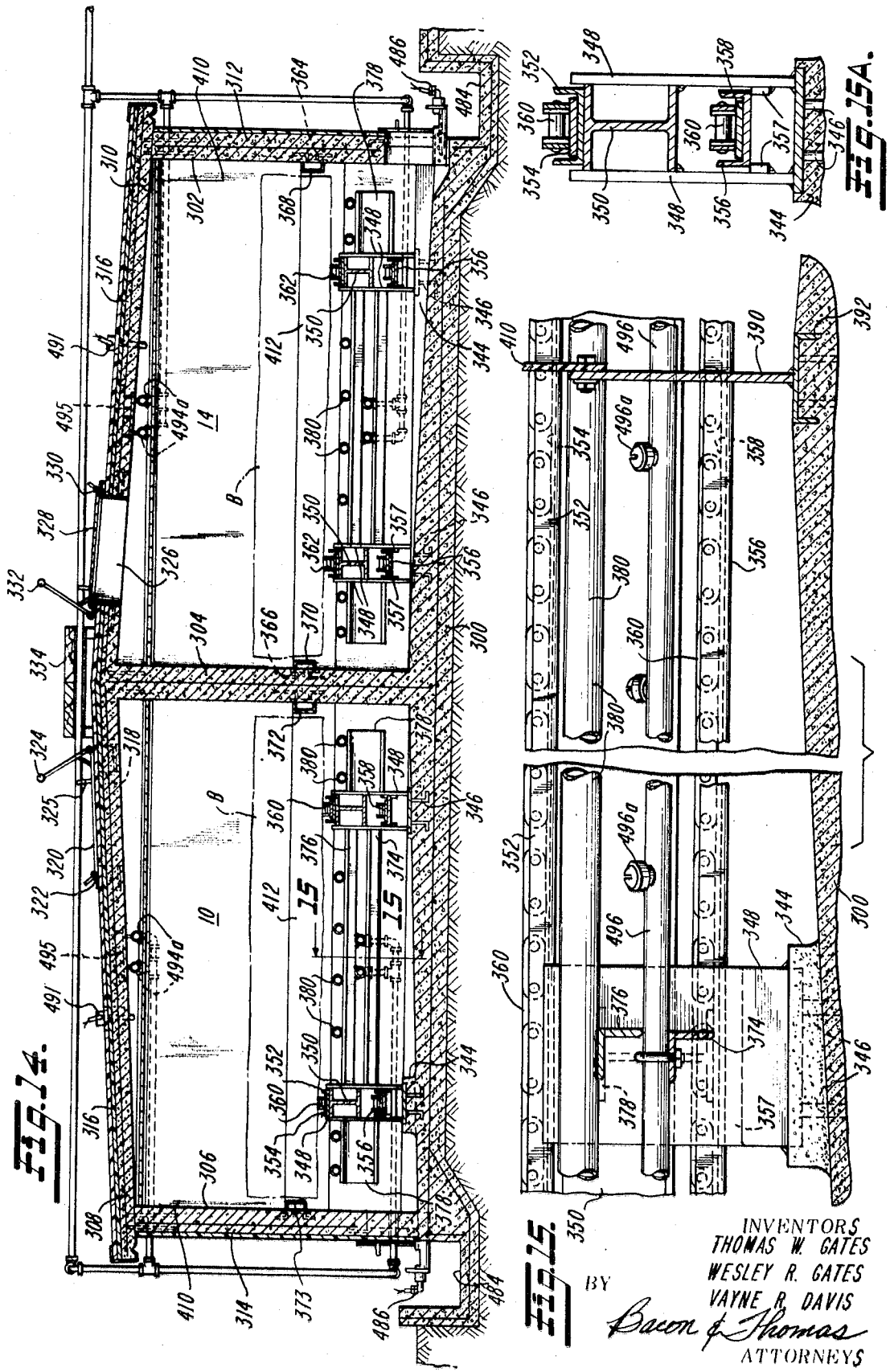

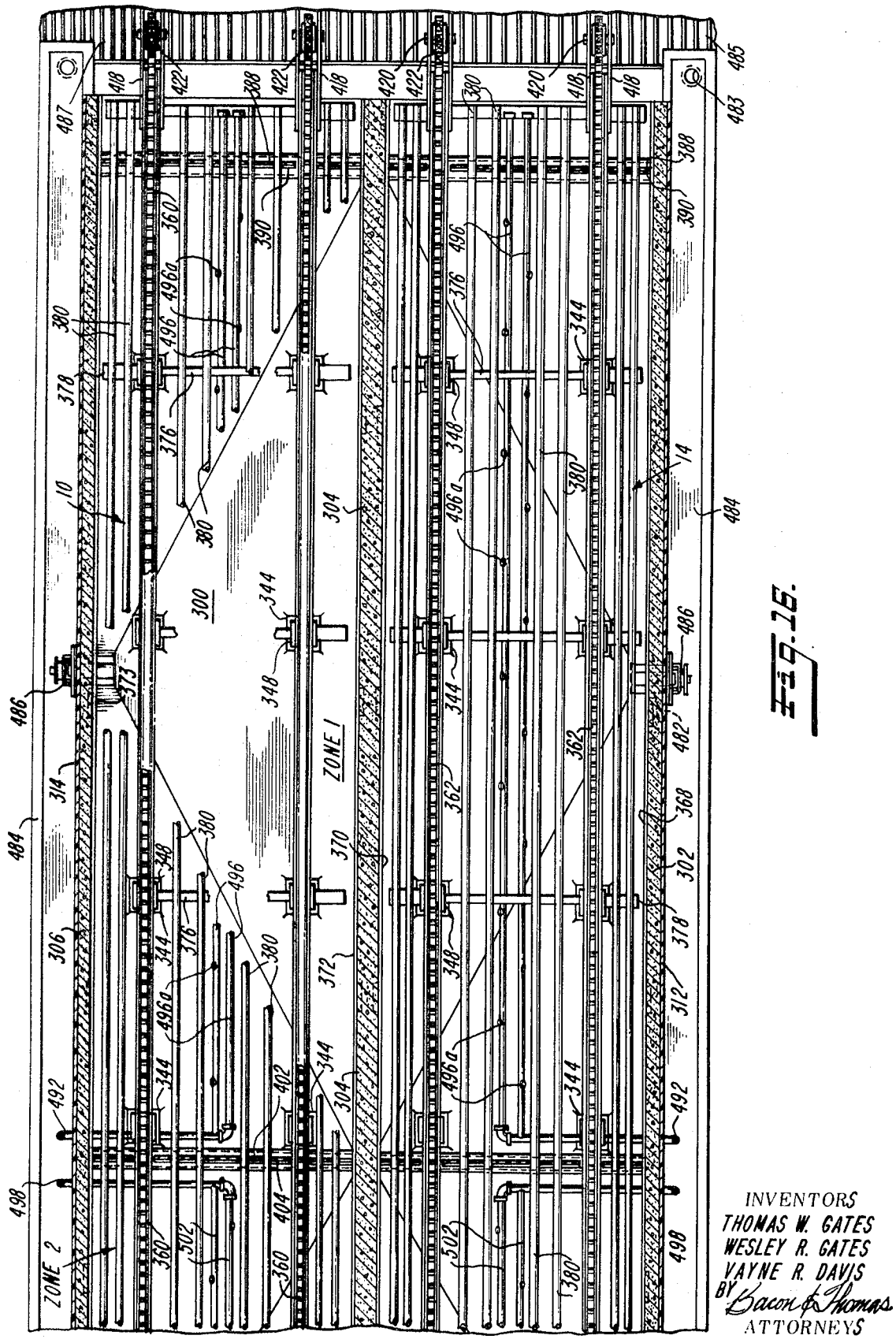

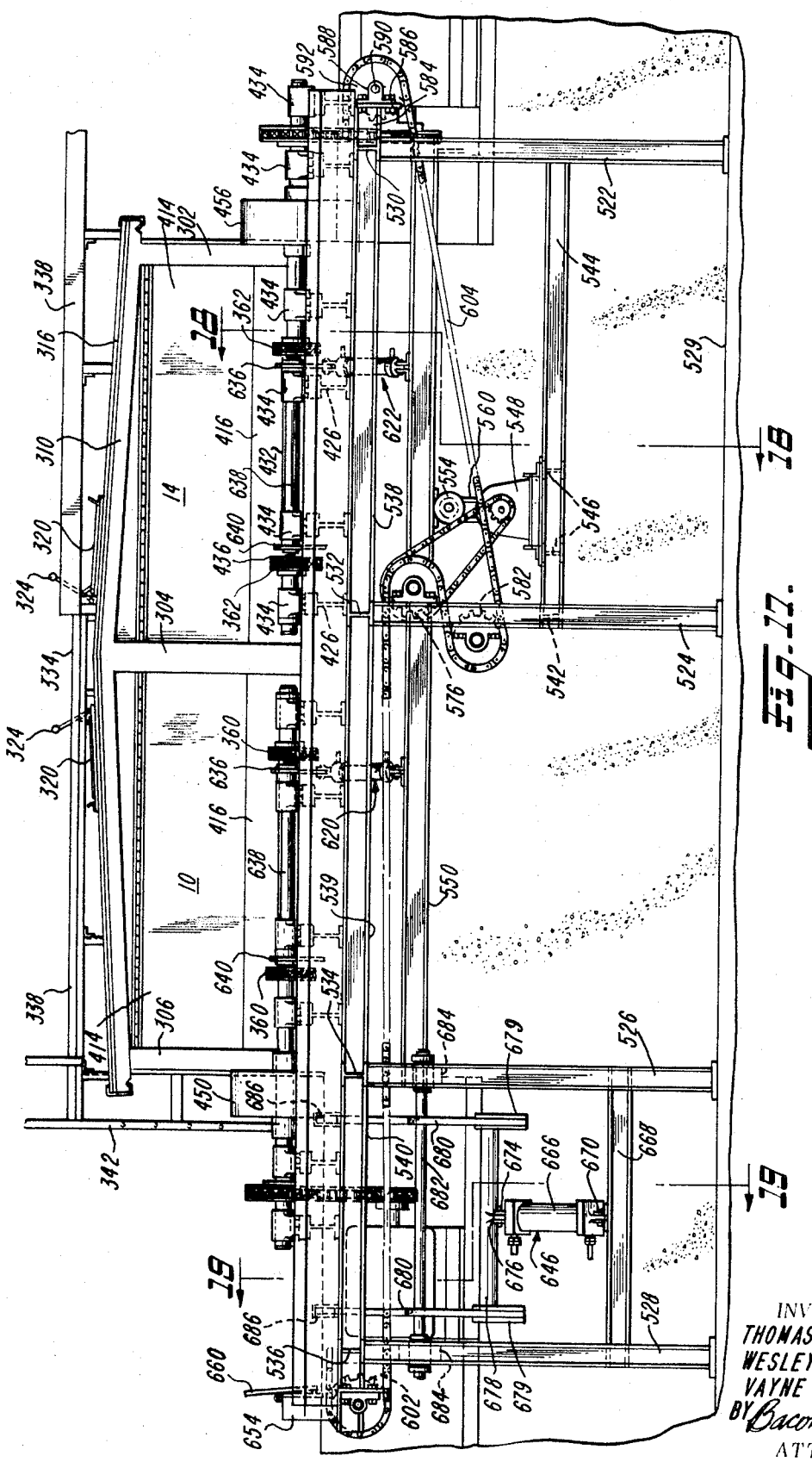

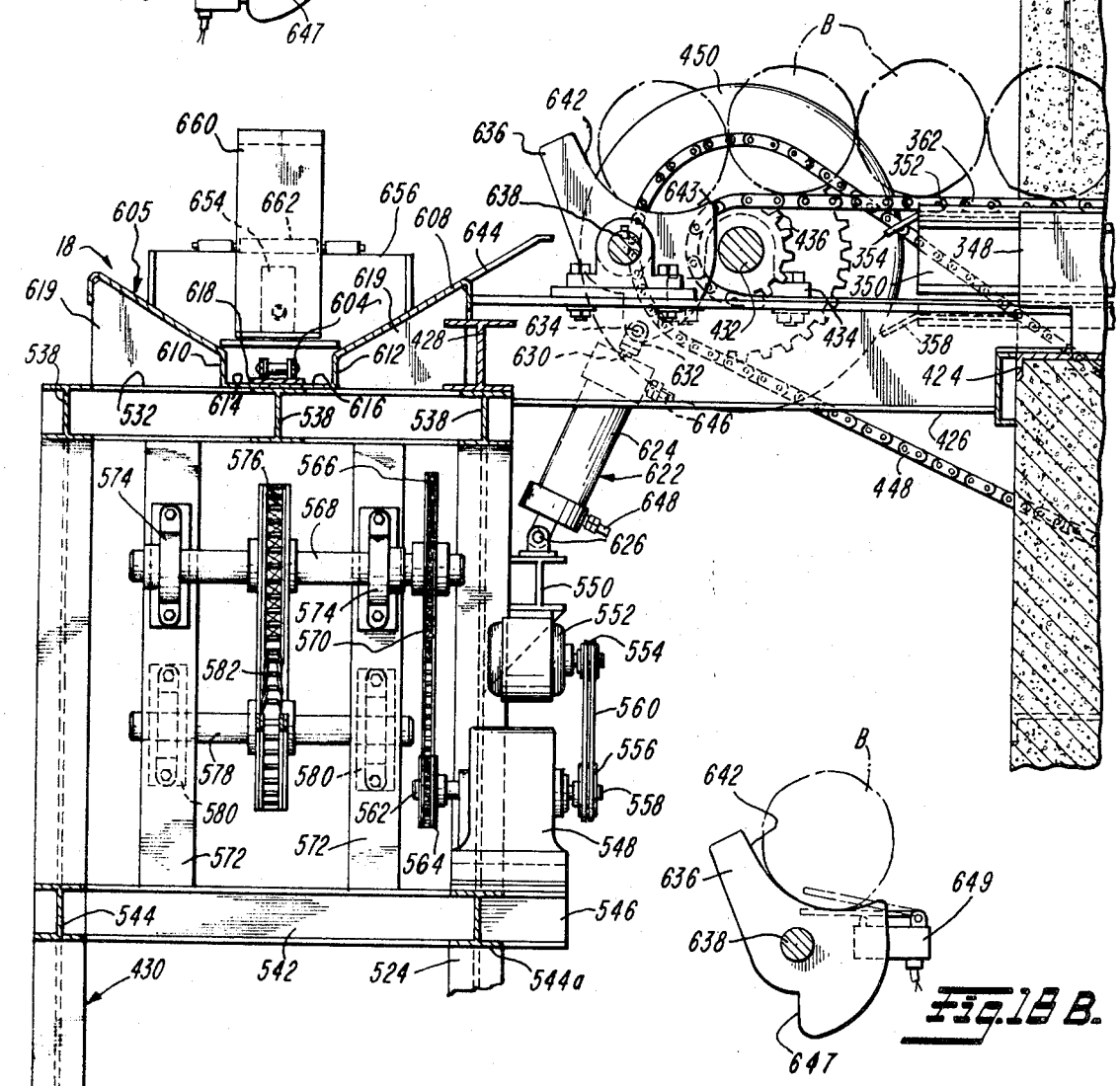

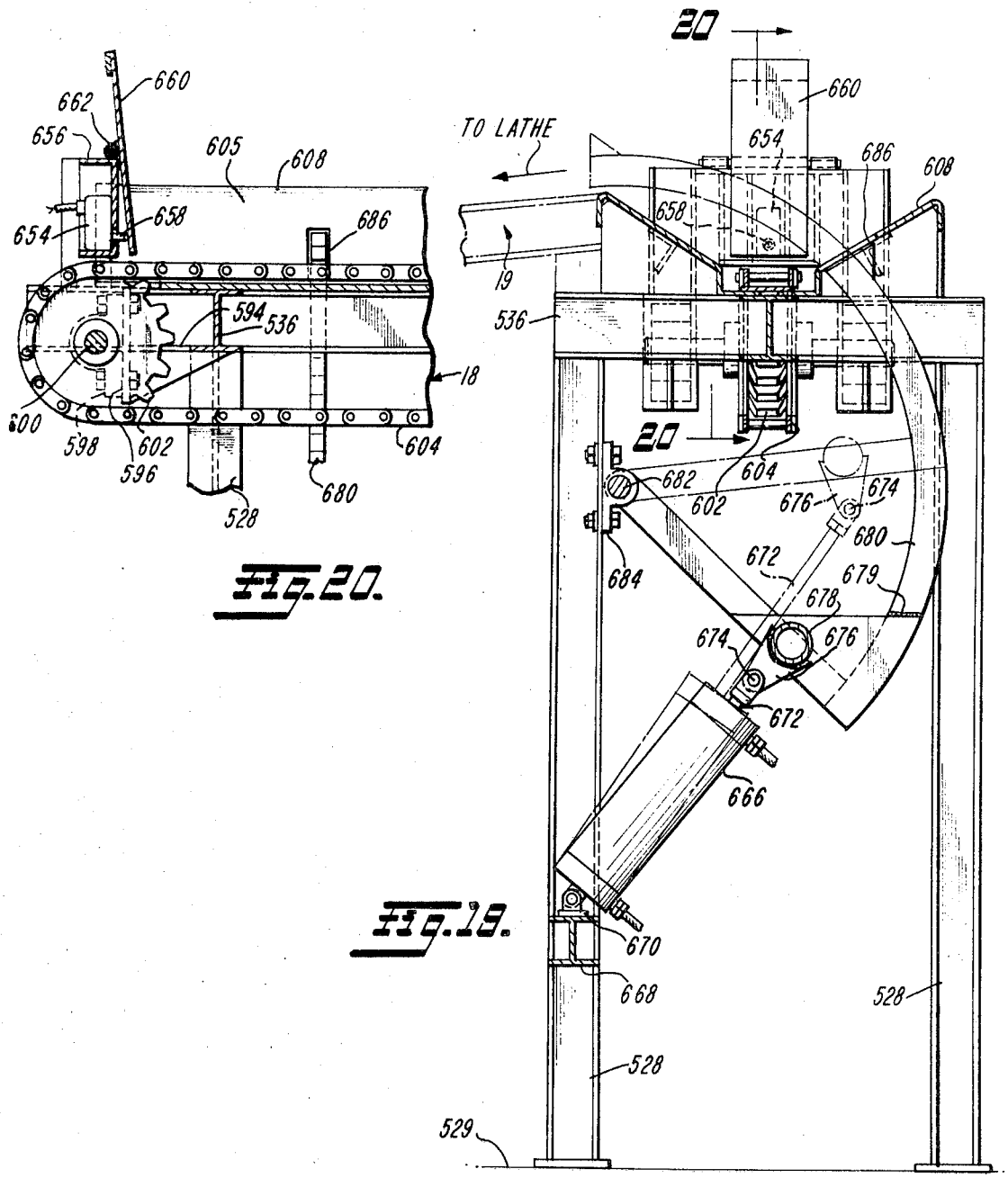

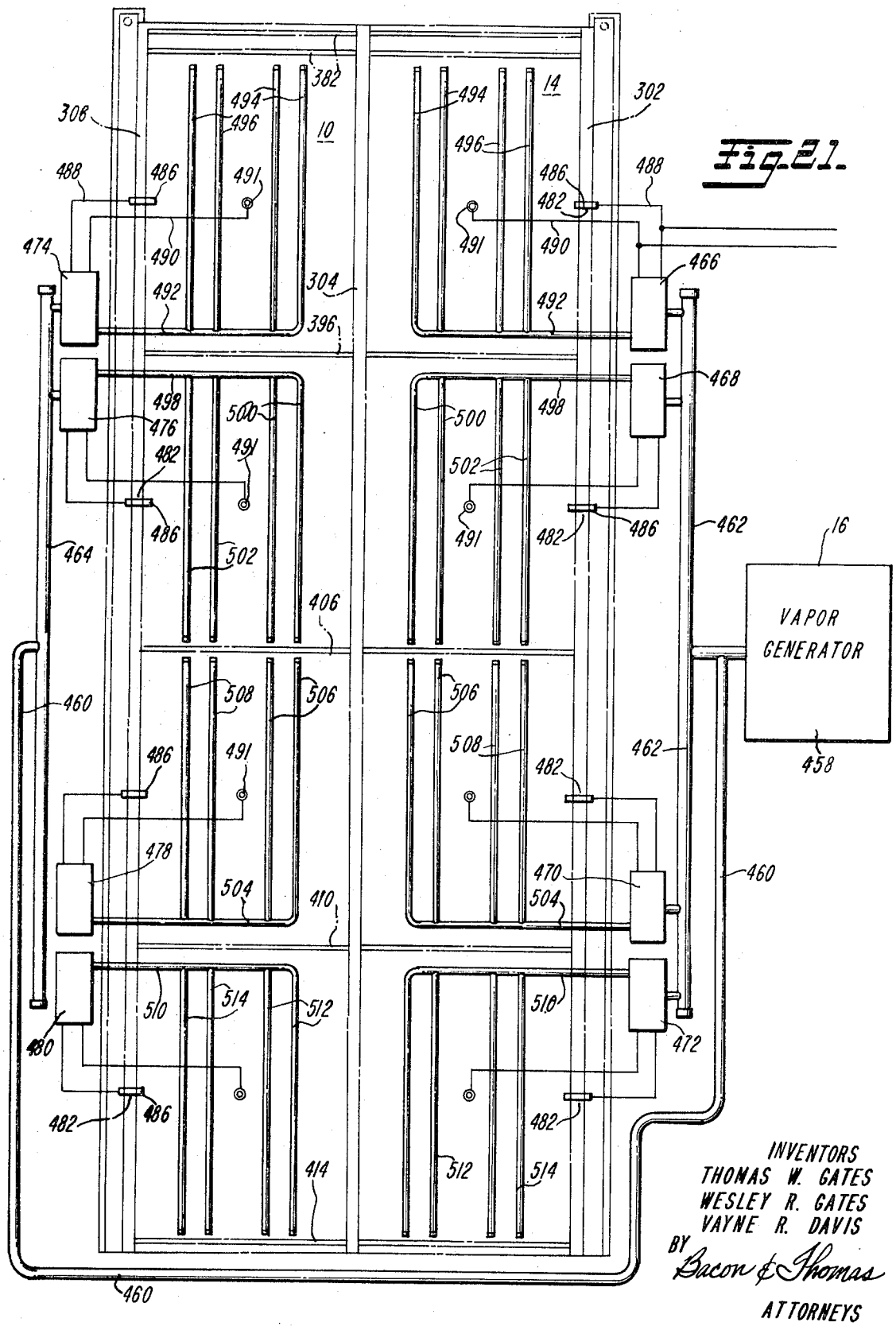

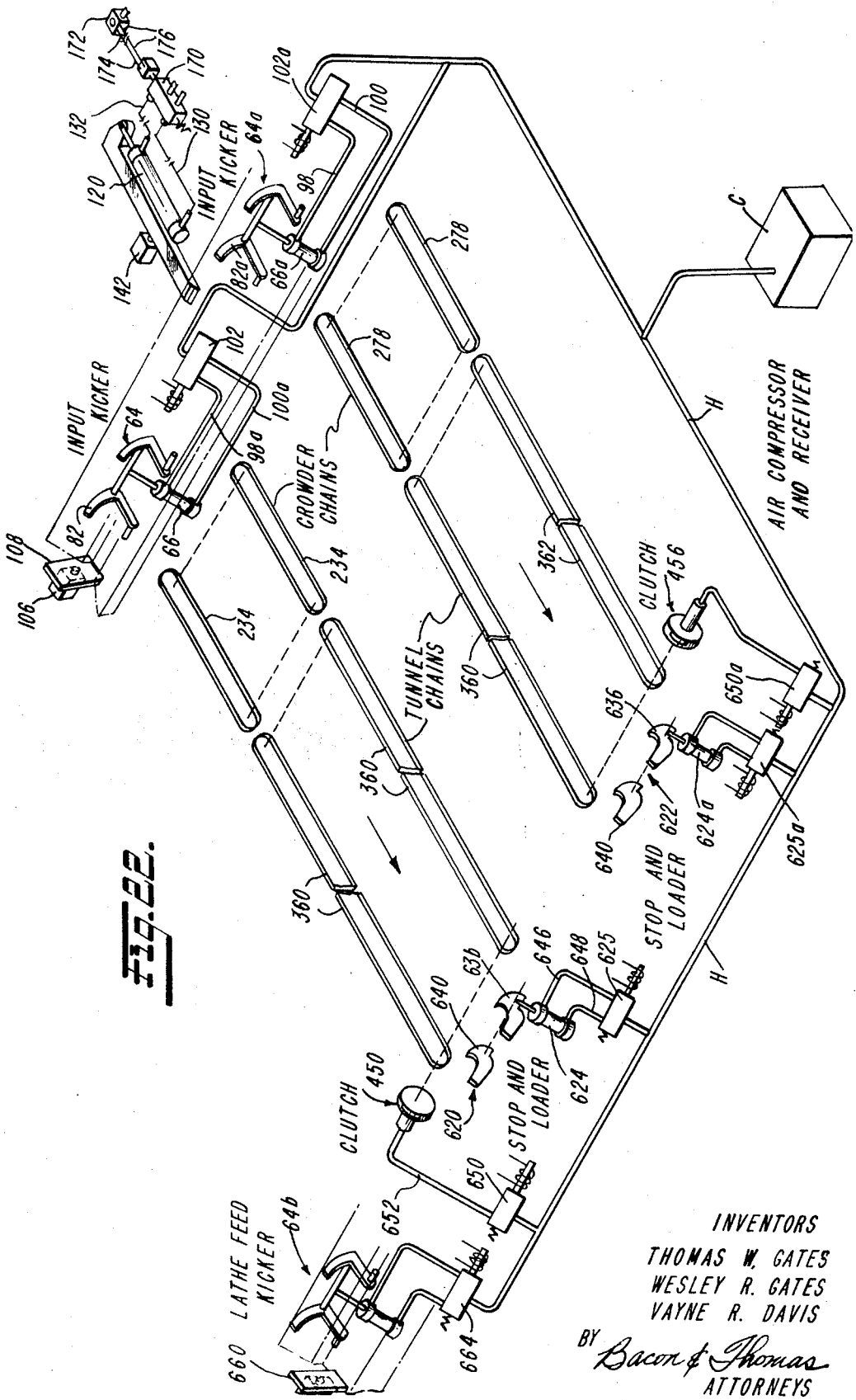

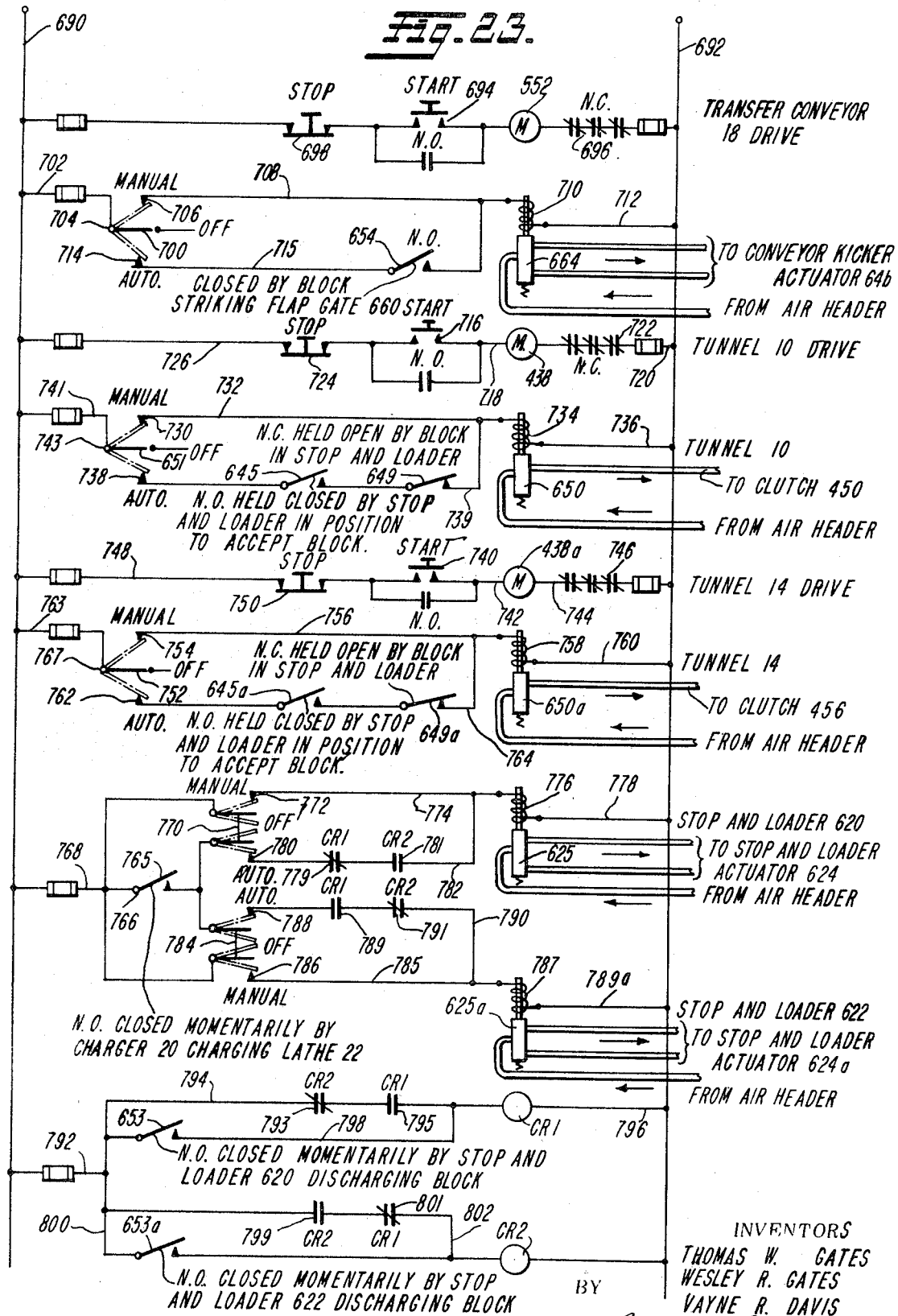

STEAM TUNNELS FOR TREATING LOGS AND METHOD OF TREATMENT

BACKGROUND OF THE INVENTION

In the past, difficulties have been encountered in the plywood and veneer industries in cutting or peeling logs or blocks to produce high quality veneer from wood of both hard and soft species. These problems are caused by the inherent characteristics of the wood fiber structure of the species. For example, the presence in the wood of hard or ingrown knots, alternating bands of soft spring wood and hard summer wood, and areas of cross-grain may all contribute to a lower recovery rate of veneer as the sheets are peeled at the lathe, unless the blocks have been properly preconditioned. Thus, in the peeling operation, the knots may break and fall from the sheet leaving undesirable holes, or cause the sheet to tear. The alternating bands of soft and hard wood tend to cause chatter at the lathe knife, thereby resulting in ridges or pock marks on the sheet, splits or cracks along its edge, or tears along the entire sheet surface.

In order to overcome these difficulties, it has become customary in the veneer industry to heat the logs or wood blocks in order to soften or plasticize them so that they can be more easily peeled into high quality veneer. The proper degree of heating and saturation of the wood softens the fibers, particularly the hard knots and rings of summer wood. Care is necessary in the heating and saturating of the blocks, since insufficient heat will not noticeably soften the blocks; whereas, excessive heat tends to destroy the wood fibers.

1. Field of the Invention

The present invention relates to an apparatus and method for heating and plasticizing logs or wood blocks, and where a moisture depletion exists, to resaturate and heat the blocks to the proper state of plasticizing for peeling into high quality veneer for use in making plywood panels, etc.

2. Description of the Prior Art

Various attempts have been made heretofore to provide methods and apparatus for treating logs or blocks to impart thereto the necessary heating and plasticizing to condition the blocks for peeling with a minimum amount of damage and waste.

For example, one prior method consisted in submerging the logs in a vat containing hot water between about 180° and 212° F. This method requires a great deal of time and is inherently slow because of the handling involved and the limited capacity of the vats. A less time consuming method requires the use of concrete steaming vaults, employing various heating mediums, such as, hot water sprays, dry steam, or a combination of dry steam and a hot water spray. These methods attempted to duplicate the results obtained by the earlier hot water immersion bathe. However, such methods do not provide complete moisture coverage of all of the logs or result in a uniform temperature and uniform degree of saturation throughout the log.

A more recent and more efficient apparatus and method for treating logs to be cut into veneer is disclosed in Mortensen U.S. Pat. No. 3,448,530, which, while it employs a steam vault about 75 feet long, 14 feet high and 12 feet wide, nevertheless, carefully regulates the steaming and moisturizing of the logs according to their condition and the particular species of wood involved. The apparatus and method disclosed in the Mortensen patent operate quite satisfactorily, but the system is inefficient in the respect that the logs must be loaded into the vault and piled upon each other until the vault is full, and after conditioning be removed from the vault, by a fork lift. Further, since the logs are stacked in the vault until the vault is full, a long period of time (about 5¾ hours to 8 hours) is required to condition all of the logs before any can be removed and delivered to a peeling lathe. The logs remaining in the vault must be "steeped" until removed to keep them in a soft and moist condition so that they will not dry out and harden up before they are used.

The principles of heating and saturating the logs disclosed in the Mortensen U.S. Pat. No. 3,448,530, are employed in the treatment of the blocks as contemplated by the present invention, and such teachings of the Mortensen patent are hereby incorporated by reference. However, due to the novel tunnel design and conveyor system of the present invention, the block conditioning cycle is reduced to about 2 hours.

SUMMARY OF THE INVENTION

The present invention is disclosed herein as embodying two tunnels disposed side by side, but this is by way of example only and not limitation, since the same principles are applicable to a single tunnel, or to more than two tunnels.

The foregoing objections and disadvantages of the prior art are overcome by the present invention, which provides for introducing the blocks into the steam tunnels by endless conveyors and carrying the blocks through the steam tunnels, also on endless conveyors, at a speed suitable to the capacity of the veneer lathe. More specifically, the logs are delivered to a conventional barker, which removes the bark therefrom, and are then delivered to an input conveyor having a saw associated therewith for cutting successive logs into blocks of suitable length (about 8½ feet) to be received in the steam tunnels. The blocks supplied to the input conveyor are successively "kicked" off the input conveyor and onto crowder conveyors leading to the entrance to each tunnel. The crowder conveyors deliver the blocks to endless conveyors extending for the full length of tunnels, so that the blocks are carried through the tunnels at a desired speed. The crowder conveyors travel at a speed considerably faster than the tunnel conveyors so that the conveyor chains "slip" relative to the blocks and the blocks are "crowded" or held close against each other as they are supplied to the slower moving tunnel conveyor at the entrance to the steam tunnels.

Each steam tunnel is divided into four zones by flexible flaps. An inspection door in the roof portion of each zone provides ready access thereto. Highly saturated steam is speparately supplied to each zone of the tunnels so that the desired conditioning of the blocks occurs as they are moved through the successive zones in a single layer. Each zone has a condensate discharge outlet with a temperature sensor therein, and a vapor temperature sensor near the top of the zone. The conditioning of the blocks from the time that they enter until they leave the tunnels can be varied to meet operating conditions. but usually requires a total time of about two hours. In a typical cycle, the blocks may enter Zone 1 at a temperature as low as about 30°F or lower in cold weather; or 70°F, or higher in the summertime. Regardless of the temperature at which the block enters the steam tunnel, the block is conditioned so that by the time it reaches the end of Zone 1, its temperature is about 70°F. This is effected by introducing steam and vapor into Zone 1 at a temperature up to 211°F, or just below the flash point of the heated fluid. The vapor is distributed in Zone 1 through a suitable number of steam nozzles, which discharge a mixture of about 50 percent moisture and 50 percent vapor against the blocks from above and below. The heating phase in Zone 1 is automatically controlled so that the blocks enter Zone 2 at a temperature of about 70° at their exterior and with about a 30 percent saturation. This condition is reflected by a condensate discharge temperature from Zone 1 of about 70°F.

The amount of steam introduced into Zone 2 is also automatically controlled so that the condensate leaving the zone has a predetermined value. This value may read anywhere from 85° to 95°F. Such condensate temperature will usually result in the temperature of the block being increased to about 100°F. and the saturation increased to about 50 percent. Here again, the number of nozzles operating in Zone 2, or the length of time of their operation, will depend upon the desired increase in the temperature of the blocks.

As the blocks are moved from Zone 2 into Zone 3, they would be subjected to the discharge from 20 nozzles, for example. The length of time that the nozzles are in operation can be correlated with the speed of the tunnel conveyor to produce the desired conditioning. Depending upon the condition of the blocks, they may remain in a given zone for 30 minutes, but be subjected to steam and moisture treatment for only about 20 of the 30 minutes. In Zone 3, the blocks may be in the Zone for 30 minutes, but steamed for only 15 minutes. The main controlling factor being the temperature of the condensate discharge, which may range from 100°F to 125°F.

The blocks eventually reach Zone 4, wherein it may only be necessary to provide a holding temperature, with steam supplied intermittently every 3 to 4 minutes, to keep the blocks in the desired condition for cutting. The controlling condensate temperature from this zone is about 112°F to 125°F.

The steam supplied to all zones is modulated for each zone by a temperature regulating valve, each zone having its own valve, which is controlled by an electrical temperature sensing device that operates in accordance with the temperature of the condensate leaving the respective zones, and the atmospheric temperature in the respective zones. While each zone has a separate temperature control valve, steam for all four zones of each tunnel is preferably supplied from a single source. The conditioning periods and temperatures mentioned above apply to blocks of southern pine. It will be understood that the treating periods and temperatures will vary with different species of wood and also with respect to the initial natural moisture condition of the blocks.

The crowder conveyors are driven at a speed of about 15 feet per minute, which has been found to be satisfactory for maintaining the debarked blocks in place, since they are slippery when placed on the conveyor. The crowder conveyors operate continuously. In contrast, the tunnel conveyors are operated intermittently by engaging a clutch whenever it is desired to deliver a block from one of the steam tunnels. The clutch is operated whenever there is a demand for a block at the veneer lathe to replace a block delivered to the lathe by the lathe charger. In the present system, the tunnel conveyors deliver a treated block to a "stop and loader device," which is intermittently operated to load a treated block onto a block transfer conveyor. A "kicker" device kicks the block off the transfer conveyor onto the in-feed deck of the lathe charger.

The present system is shown as comprising two steam tunnels, side by side, but any number of tunnels may be provided depending upon the number of lathes that are to be supplied. In the two-tunnel system disclosed herein, the blocks are removed from alternate tunnels and moved to the in-feed deck of the lathe charger. The transfer of the blocks may be either automatically or manually controlled by the operation of electrical switches, which control sonenoid valves associated with pneumatic clutches for effecting the drive of the tunnel conveyors, and with air cylinders which operate the stop and loaders to kick the blocks discharged from the tunnels onto the block transfer conveyor, and the kicker device for kicking the block off the conveyor for delivery to the lathe charger deck.

In contrast, with the foregoing, the block input conveyor is manually controlled insofar as the supply of blocks to the crowder coneyors is concerned. However, limit switches are associated with the input conveyor so that when a block is in position aligned with a crowder conveyor, a kicker device is automatically operated to kick the block from the input conveyor and drop it onto the crowder conveyor. Thus, a limit switch is located at the end of the input conveyor so that it is actuated by a block on the input conveyor to energize a solenoid valve for supplying air under pressure to a cylinder to actuate a kicker to remove the block from the input conveyor and deposit the same on a first crowder conveyor associated with one of the steam tunnels. A stop arm is associated with the input conveyor opposite the second crowder conveyor, which is remote from the far end of the input conveyor, and is manually actuated by an air cylinder to move it into position where it is engaged by a block on the input conveyor. The stop arm is pressed sideways by the block and actuates a switch associated therewith to complete a circuit to a solenoid valve for actuating a second kicker associated with the second crowder conveyor. In this manner, blocks can be supplied as needed to either of the two crowder converyors.

Accordingly, the principal object of the invention is to provide an apparatus and method for heating and saturating logs or blocks, to be cut with veneer, in a minimum of time.

Another object is to provide an apparatus and method that will continuously deliver treated blocks at a rate correlated to the production capacity of the veneer lathe, or lathes, of a given installation.

Still another object is to provide a tunnel and conveyor system designed to supply a veneer lathe with blocks at the same rate at which they are being cut into veneer, while allowing the blocks to be uniformly heated and saturated for a maximum period of time to place the same in ideal condition for peeling.

A further object is to provide an apparatus and method wherein substantially the entire outer surface of the blocks is simultaneously subjected to the action of nozzles discharging limit highly saturated steam there against.

A still further object is to provide an apparatus and method wherein the conditioning of the blocks is progressively effected by moving the blocks through successive zones and subjecting the blocks to increasing temperatures and saturation while moving through the zones.

Still another object is to provide a novel conveyor system for supplying blocks to a steam tunnel, conveying the blocks through the tunnel and delivering the blocks to a veneer cutting lathe.

A more specific object is to provide a conveyor system for use with a plurality of steam tunnels that can be operated either manually or automatically to discharge blocks alternately from said steam tunnels.

A still further object is to provide a tunnel for treating logs that is very low in height, compared to prior log steaming vaults, and, therefore, is less expensive to construct and maintain.

Other objects and advantages of the invention will be apparent from the following description taken in conjunction with the accompanying drawings.

DESCRIPTION OF THE DRAWINGS

FIG. 1 is a diagrammatic plan view of the embodiment of the present invention comprising two steam tunnels, an input conveyor, crowder conveyors, tunnel conveyors, a transfer conveyor, a lathe charger, a veneer cutting lathe, etc.

FIGS. 2 and 2A are enlarged fragmentary side elevational views of the apparatus as viewed on the line 2-2A of FIG. 1.

FIGS. 3 and 3A are enlarged fragmentary plan views of the tunnels, crowder conveyors, tunnel conveyors, etc., shown in FIG. 2.

FIG. 4 is an enlarged fragmentary vertical sectional view through one of the inspection doors in the roof of the tunnels, taken on the line 4—4 of FIG. 3A.

FIGS. 5 and 5A are fragmentary vertical sectional views taken on the line 5—5A of FIGS 3 and 3A respectively.

FIG. 6 is an enlarged fragmentary, transverse, vertical sectional view showing the crowder decks at the inlet of one of the tunnels, taken on the line 6—6 of FIG. 2, and showing certain details of the kicker device for unloading the blocks from the input conveyor onto the crowder decks.

FIG. 7 is a vertical longitudinal sectional view through one of the crowder decks taken on the line 7—7 of FIGS. 3 and 6, respectively.

FIG. 8 is an enlarged fragmentary vertical sectional view, taken on the line 8—8 of FIG. 7, and showing certain details of one of the crowder deck conveyors.

FIG. 9 is an enlarged vertical view, taken on the line 9—9 of FIG. 8, and particularly illustrating the block stop arm and limit switch associated therewith for operating one of the kickers.

FIG. 10 is a plan view of the stop arm and limit switch shown in FIG. 9.

FIG. 11 is a perspective view of the stop arm.

FIG. 12 is an enlarged transverse vertical sectional view through the stop arm and its housing, taken on the line 12—12 of FIG. 10.

FIG. 13 is a fragmentary view showing the limit switch and the stop arm and its housing as seen on the line 13—13 of FIG. 12.

FIG. 14 is an enlarged transverse vertical sectional view through the steam tunnels, taken on the line 14—14 of FIG. 3A.

FIG. 15 is an enlarged fragmentary vertical sectional view showing several of the steam nozzles, taken on the line 15—15 of FIG. 14.

FIG. 15A is an enlarged sectional view showing the supporting means for one of the tunnel conveyor chains.

FIGS. 16 and 16A are enlarged fragmentary horizontal sectional views through the steam tunnels, taken on the line 16-16A of FIGS. 5 and 5A.

FIG. 17 is an enlarged rear end elevational view showing the exits from the tunnels, the transfer conveyor and its drive means, the stop and loader devices, etc.

FIG. 18 is an enlarged vertical sectional view through one of the stop and loaders, taken on the line 18—18 of FIG. 17.

FIGS. 18A, 18B and 18C are diagrammatic views illustrating various switches that are operated by or associated with the stop and loader devices.

FIG. 19 is an enlarged vertical sectional view, taken on the line 19—19 of FIG. 17, showing the kicker mechanism for transferring the blocks from the transfer conveyor onto the in-feed deck of the lathe charger.

FIG. 20 is a fragmentary vertical sectional view, taken on the line 20—20 of FIG. 19, showing the limit switch at the end of the transfer conveyor.

FIG. 21 is a diagrammatic view of the piping system for supplying saturated steam to the respective zones of the two tunnels.

FIG. 22 is a diagrammatic view of the pneumatic control system for the principal air-operated components of the block handling portion of the apparatus.

FIG. 23 is a diagrammatic view of the electrical control system for the block handling conveyors, etc.

Referring to FIG. 1 of the drawings, a schematic layout of a block heating and saturating system employing the present invention is shown. This system includes a conventional barker 2 for removing the bark from the logs and depositing the same on an adjacent deck; a block input conveyor 4 having a saw 6 associated therewith for cutting the logs into blocks of a suitable length; a crowder deck 8 at the entrance to a steam tunnel 10; a crowder deck 12 at the entrance to steam tunnel 14; a vaporizer system 16 for supplying highly saturated steam to the steam tunnels 10 and 14; a block transfer conveyor 18 at the discharge end of the tunnels 10 and 14; a lathe in-feed deck 19, and a lathe charger 20 for mounting treated blocks in a veneer cutting lathe 22. The barker 2 and lathe 22 are conventional. The vaporizer system 16 and the control means therefore, is of the type disclosed in Mortensen U.S. Pat. No. 3,448,530.

Figure 16A:
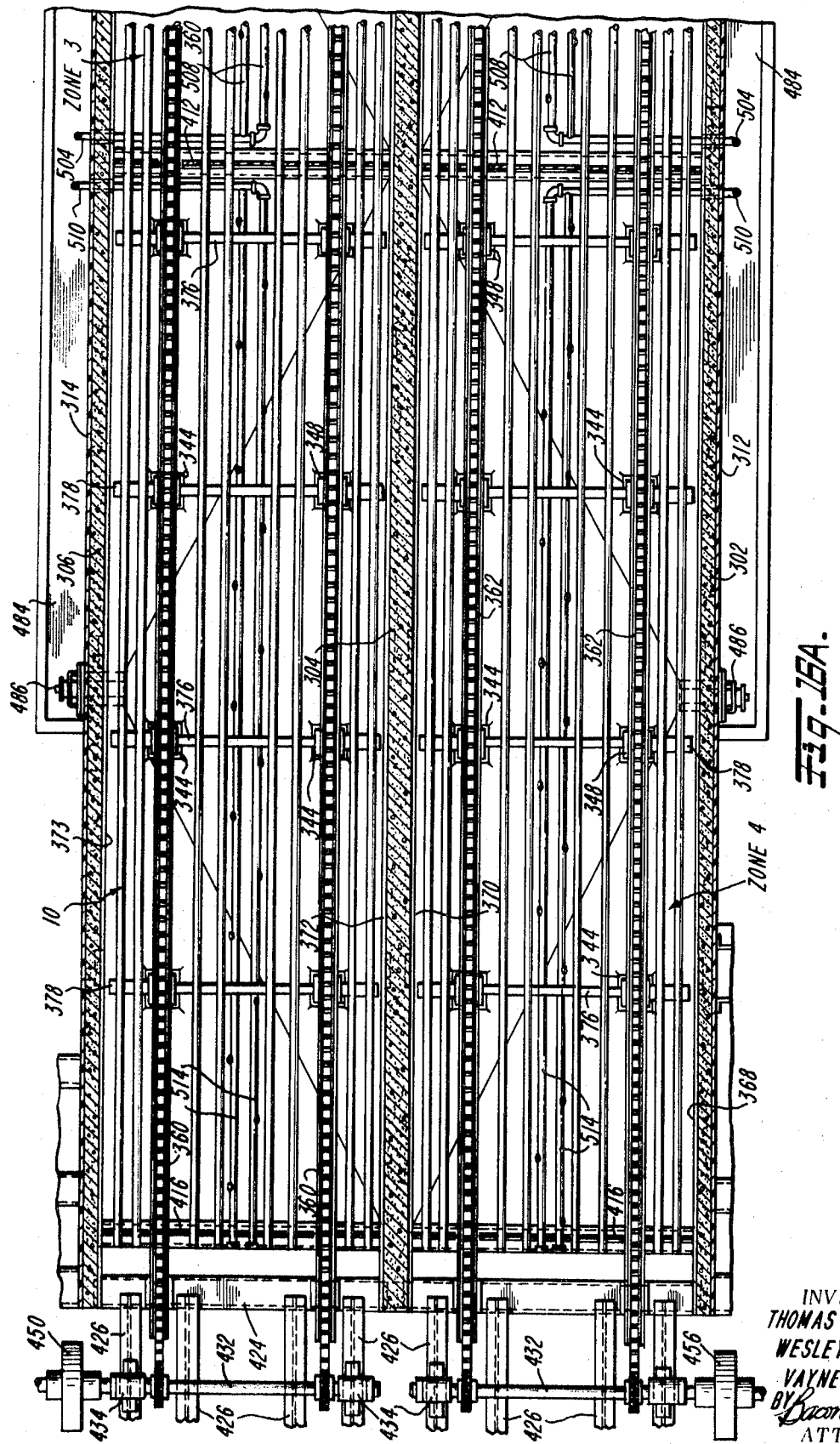

The block input conveyor 4 is illustrated in further detail in FIGS. 6, 7 and 9 to 13 and is arranged in front of the crowder decks 8 and 12 to supply debarked blocks thereto as needed. The block input conveyor 4 comprises a frame including a series of upright I-columns 24 secured at their lower ends to supports 26 embedded in a reinforced concrete foundation slab 28. The columns 24 are connected together at their upper end by transverse channel members 30 and at intermediate points by channels 32. The columns 24 are additionally interconnected about midway of their height by longitudinal I-beams 34 and 36. Channels 38 and 40 have their webs arranged in confronting relation and are supported by and welded to the transverse members 30. A conveyor trough 42 is supported by channel members 38 and 40 and intervening plates 39 and 41, (FIG. 9), and comprises downwardly and inwardly sloping side sections 44 and 46 having extensions that abut and form a channel-shaped portion having a bottom wall 48 and sides 50. A wear plate 52 is secured to the bottom wall 48 and provides a support for the upper run of an endless input conveyor chain 54. The conveyor chain 54 is driven through a speed reducer 56 by an electric motor 58 (FIG. 1) controlled by a manually operated switch 60. In normal operation, the conveyor chain 54 is continuously driven.

The conveyor frame has mounted thereon a pair of kicker devices, which are automatically actuated to kick blocks off the block input conveyor 4 onto the crowder decks 8 and 12. Thus, a kicker device 64, FIG. 6, is mounted on the conveyor frame to serve the crowder deck 8 and a similar kicker device 64a is mounted to serve the crowder deck 12. Each of the kicker devices comprises an air-operated cylinder 66 that is pivotally mounted at its lower end on a bracket 68, FIG. 7, by a pivot pin 70. A piston rod 72 extends beyond the upper end of the cylinder 66 and has a clevis 74 mounted thereon. A lug 76 is pivotally connected to the clevis 74 by a pin 78. The lug 76 is welded to a pipe 80 that operates two kicker arms 82. Each kicker arm 82 has a straight portion 84 that is connected at one end to a rod 86 rotatably mounted in bearings 88 bolted to the rear columns 24. Each kicker arm also includes an arcuate portion 90 that is braced relative to the straight portion 84 by gussets 92 welded to the opposite sides thereof. The pipe 80 is welded to one gusset 92 of each kicker arm 82. The free end of the arcuate portion 90 has a triangular member 94, FIG. 9, welded thereto to increase the width of the block-engaging end of the kicker arm 82. The arcuate portions 90 are movable through openings 96 in the inclined wall 46 of the conveyor trough 42. When in retracted position, the free ends of the kicker arm 82 lie below the plane of the wall 46.

The cylinder 66 is air-operated and has conduits 98 and 100 connected thereto for supplying fluid under pressure to advance and retract the kickers 82. The conduits 98 and 100 are connected to a solenoid operated valve 102, FIG. 22, connected by electrical conductors 104 and 105 to a limit switch 106. The kicker device 64a is constructed and mounted upon the input conveyor frame in the same manner as the kicker device 64. In the interest of brevity, the corresponding parts have been identified by the same reference numerals, except that the solenoid valve connected with the cylinder 66 of the kicker 64a is identified by the numeral 102a. Compressed air for actuating the kickers 64 and 64a, and other air-operated components of the system, is supplied by an air compressor and receiver C (FIG. 22).

The limit or stop switch 106, FIGS. 3 and 6, is a time delay switch that automatically opens after a set period has expired. The switch is mounted on a bracket 107 at the far end of the block input conveyor 4 and controls the operation of the kicker device 64 for kicking blocks onto the crowder deck 8. The switch 106 includes a pivoted flap plate 108, that is engaged and actuated by a block carried by the conveyor chain 54 to close the switch 106 and thus energize the solenoid valve 102.

A manually controlled stop arm assembly is mounted on the frame of the block input conveyor 4 and is operated whenever it is desired to deliver a block to the crowder deck 12. So long as the stop arm is inactive, the conveyor 4 can carry blocks for delivery to the crowder deck 8. Should it be desired to deliver a block to the crowder deck 12, a manually operated switch is actuated to extend a stop arm into obstructing position across the input conveyor 4, whereupon the kicker device 64a will be automatically actuated, as will presently be explained.

A hollow housing 110 has a transverse flange 112 that is bolted or otherwise secured to the channel 40 and to the conveyor wall section 46. A stop arm 114 is sliably mounted in the housing 110 and has an inclined portion 115 at one end and a lug 116 at the other end. The stop arm 114 extends through a pocket 117 in the conveyor side wall 46. The inclined end 115 is sloped on about the same angle as the wall 46, and assumes a position outwardly of the wall when the arm 114 is retracted. A bracket 118 is bolted to the flange 112 and extends parallel with the housing 110. A fluid pressure operated cylinder 120 is pivotally connected at one end thereof by a pin 122 to the bracket 118. Piston rod 124 extends from the cylinder 122 and carries a clevis 126 that is connected by a pin 128 to the lug 116. Conduits 130 and 132 are connected with opposite ends of the cylinder 120 for supplying air under pressure thereto for actuating the piston rod 124 to reciprocate the stop arm 114. A bar 133 is welded to the top side of the stop arm 114 for engagement with the housing 110 to limit movement of the stop arm toward the conveyor trough 42. The width of the stop arm 114 is substantially less than the width of the passageway in the housing 110 so that the stop arm 114 has considerable free lateral movement in the housing for a purpose which will be explained later.

The stop arm housing 110 has short sections of angle iron 134 (FIG. 12), welded to the upper and lower sides thereof, which serve as a mounting for a plate 136 secured thereto by bolts 138. A bracket 140 is welded to one side of the plate 136 and has a time delay limit switch 142 adjustably secured thereto by bolts 144 extending through slots 146 in the bracket 140. The plate 136 has a threaded opening 148 in which a threaded bushing 150 is mounted. A rod 152 is sliably mounted in the bushing 150 and has a head 154 at its inner end which is normally disposed in the clearance space between the stop arm 114 and the adjacent wall 156 of the housing 110. A compression spring 158 is centered upon an extension 160 of the busing 150 and engages the head 154. The compression of the spring 158 can be adjusted by repositioning the bushing 150 or by adjusting a collar 162 on the rod 152. The bushing 150 is locked in a desired position of adjustment by a lock nut 164 threaded thereon. The outer end of the rod 152 engages a roller 166 on an arm 167 carried by a pivot pin 168 mounted in the housing of the switch 142.

A protective sleeve 169 surrounds the spring 158 and is welded at one end thereof to the plate 136. The sleeve 169 prevents dirt or other debris from getting into a position where it would interfere with the operation of the stop arm 114 and the rod 152. It will be noted from FIGS. 12 and 13, that the stop arm 114 has ample clearance within the housing 110 so that it can be freely moved back and forth without binding against the head 154 of the rod 152.

Blocks are delivered one at a time from the barker 2 to the input conveyor 4 under manual control. The stop arm 114 is also manually controlled so that it can be projected across the trough 42, to obstruct movement of a block carried by the input conveyor chain 54. To this end, the conduits 130 and 132 are connected with a solenoid operated valve 170, FIG. 22, which controls the supply and exhaust of operating fluid to both ends of the cylinder 120. Operation of the solenoid valve 170 is manually controlled by a switch 172 connected with the valve 170 by electrical conductors 174 and 176.

As will be readily understood, operation of the switch 172 will energize the solenoid valve 170 to admit operating fluid through the conduit 132 into the cylinder 120 to effect movement of the stop arm 114 into block-obstructing position above the input conveyor chain 54. As the chain 54 carries a block into engagement with the side of the arm 114 opposite the switch 142, the arm will be pushed sidewise against the head 154 of the rod 152 and cause it to be moved to the right, as viewed in FIG. 12, thereby moving the arm 167 counter-clockwise and causing switch 142 to close.

Closing of the switch 142 will effect actuation of the kicker device 64a by energizing the solenoid valve 102a to supply operating fluid to the cylinder 66a to move the kicker arms 82a upwardly to thereby move the block being restrained by the stop arm 114 over the edge of the trough side wall 44 to drop onto the crowder deck 12. The crowder deck 12 supplies blocks to the tunnel 14 as has been previously stated. If a block is to be delivered to the tunnel 10 instead of the tunnel 14, the stop arm 114 is not actuated and the block input conveyor chain 54 can then carry the block to a position where it can be automatically kicked onto the crowder deck 8 by the kicker device 64 in response to actuation of the limit switch 106.

The crowder decks 8 and 12 are best shown in FIGS. 3, 6 and 7 and are similarly constructed. Both decks are mounted upon a frame work generally identified by the numeral 188 and comprise rows of vertical columns 190, 192 and 194, each row containing six columns arranged in three pairs, as is best shown in FIG. 6. All of these columns are secured at their lower end to supports 196 embedded in the concrete foundation slab 28. The columns 190 and 192 are interconnected by I-beams 198, 200 and cross bracing 202. The columns 192 and 194 are interconnected by I-beams 204. The columns 190 are welded at their upper end to a transverse H-beam 206. The columns 192 are similarly connected by an H-beam 208 and the columns 194 are likewise connected by an H-beam 210. The H-beams 206, 208 and 210 are interconnected by longitudinally extending channels 212, 214, 216 and 218. A pair of plates 220 is welded to the H-beam 206 adjacent the opposite sides of the channels 212, 214, 216 and 218. Another pair of plates 222 is welded to the H-beam 210 adjacent each of the aforesaid channels. A third pair of plates 224 is welded to the H-beam 208 adjacent the opposite side of each of said channels. FIG. 8, best illustrates the arrangement of the plates 224 relative to the channel 212 and the H-beam 208. As is here illustrated, an I-beam 226 is welded to the plates 224 in vertically spaced relation to the channel 212. The I-beam 226 is also welded to the plates 220 and 222. A channel 228 is welded to the top web of the I-beam 226. A wear plate 230 is welded to the bottom of the channel 212 and a similar wear plate 232 is welded to the bottom of the channel 228.

The crowder deck 12 comprises two conveyor chains 278 that extend around sprocket 236 and 238, FIG. 7. The sprockets 236 are mounted upon a shaft 240 supported in bearings 242 bolted to the plates 220. The sprockets 238 are mounted upon a shaft 244, Short I-beams 246, 248, 250 and 252 are welded at one end to the H-beam 210 and are welded at the other end thereof to a channel 254 embedded in a retaining wall 256 for the steam tunnels 10 and 14. The shaft 244 is journaled in bearings 258 mounted upon the I-beams 246 and 248. As will be readily understood from FIG. 8, the upper run of the crowder conveyor chains 234 move along the wear plates 232 and the lower run along the wear plates 230.

Referring to FIGS. 6 and 7, the I-beams 257 are welded between the I-beams 204 and serve as a support for a speed reducer 259. A motor 260 is mounted on the speed reducer 259 and drives an output shaft 262 having a sprocket 264 mounted thereon. A shaft 266 is mounted in bearings 268 bolted to the columns 194. A sprocket 270 is mounted on the shaft 266 and is driven by a chain 272 extending around the sprocket 264. A relatively smaller sprocket 274 is mounted upon the shaft 266 and drives a sprocket 275 on the shaft 244 through a chain 276. Thus, the crowder chains 234 are driven through the chains 272 and 276 and the sprockets associated therewith.

The crowder deck 8 comprises a pair of chains 234 that are similar to the chains 278 and are similarly mounted and driven. Hence, the parts of the crowder deck 8 corresponding to those of the crowder deck 12 have been identified by similar numerals.

As is best shown in FIGS. 3 and 7, the crowder conveyor chains 234 are disposed between guide bars 280 and 282, and the crowder chains 278 are disposed between the bar 282 and a third guide bar 284. The guide bar 280 is disposed above the plane of the crowder chains 278 by short uprights 286 welded to the H-beams 206, 208 and 210, and is reinforced by shallow I-beams 288 welded thereto and to the uprights 286.

The guide bar 282 is generally H-shaped in cross section, and has a horizontal web that is welded to the upper end of uprights 290, the lower end of which is welded to the H-beams 206, 208 and 210. The flanges forming the upright portions of the H serve as a guide surface for the ends of the blocks while the blocks are resting upon the crowder chains of both crowder decks 8 and 12. The guide bar 284 is supported by uprights 292 welded to the H-beams 206, 208 and 210 in the same manner as the support for the guide bar 280. Thus, blocks on crowder deck 8 are guided on the chains 234 by guide bars 284 and 282, and blocks on crowder deck 12 are guided on the crowder chains 278 by guide bars 282 and 280.

It will be noted from FIG. 3, that the arms 82a kicker device 64a and the stop arm 114 are located, so that when a block is kicked off the input conveyor 4, it will land on the crowder chains 278 between the guide bars 280 and 282. It will be further noted that the limit switch 106 is located so that when the arms 82 of the kicker device 64 kick a block off the input conveyor 4, it will land on the crowder chains 234 between the guides 282 and 284.

The crowder conveyor chains 234 supply blocks to the steam tunnel 10 and the crowder conveyor chains 278 supply blocks to the steam tunnel 14. The motors 260 driving the crowder conveyor chains 234 and 278 rotate at such speed that the chains travel at a rate of about 15 ft. per minute which is substantially higher than the 3 feet per minute speed of the tunnel conveyor described hereinafter. Hence, the logs resting upon the crowder chains 234 and 278 are forceably crowded against each other in advance of the tunnels 10 and 14.

The H-beams 206, 208 and 210 support a deck or walkway 294, FIGS. 2 and 3, to which access is had via a stairway 296. These H-beams also support a relatively smaller walkway 298 at the opposite side of the crowder deck. The walkways 294 and 298, and the stairway 296 are protected by guard rails 299, as shown in FIG. 2.

Referring to FIG. 14, the tunnels 10 and 14 are made of concrete and are constructed upon a base or floor 300 and include a left side wall 302, a dividing wall 304, a right side wall 306, and a roof or ceiling sections 308 for the tunnel 10 and a roof or ceiling section 310 for the tunnel 14. The foundation and all walls of the tunnels 10 and 14 are steel rod reinforced, as will be readily understood. The exterior of the left side wall 302 is covered with heat insulating material 312, and the right side wall 306 is similarly covered with heat insulating material 314. The top roof sections 308 and 310 are also covered with heating insulating material 316. All of the foregoing heat insulating material is exteriorly coated with a waterproofing compound.

The roof section 308 has a plurality of inspection openings 318, each of which is closed by a door 320, see FIG. 4, hinged at 322 and held in closed position by a weighted lever 324. A handle 325 is mounted on the door 320 to facilitate opening and closing. The roof section 310 has similar openings 326 closed by doors 328 hinged at 330 and held closed by weighted levers 332. A central foot walk 334 extends longitudinally of the roof for the full length of the tunnels, FIGS. 2, 2A, 3 and 3A. Transverse foot walks 336 and 338 are located adjacent the rear end of the tunnels on either side of the central foot walk 334. A stairway 340 provides access from the ground to the foot walk 338, and a ladder 342 extends from the ground to the footwalk 336.

Referring to FIGS. 5 and 5A, and 16 and 16A, the foundation 300 provides a floor for the tunnels 10 and 14. Concrete pads 344 are provided on the floor at spaced intervals throughout the length of the tunnels and have embedded therein footings 346, FIGS. 14 and 15A, to which the lower end of vertical plates 348 are welded. H-beams 350 extend for the full length of the tunnels 10 and 14 and are welded to the plates 348. Aligned channels 352 are welded to the upper web of the H-beams 350 and have a wear plate 354 welded to the bottom thereof. Aligned channels 356 are disposed below the H-beams 350 and carry a wear plate 358. The channels 356 are welded to short bars 357 mounted on the plates 348. An endless tunnel conveyor chain rides upon the wear plates 354 and 358 and is generally guided in its travel by the channel members 352 and 356. Tunnel 10 contains two conveyor chains 360 and these are supported by identical structures. The tunnel 14 has two conveyor chains 362 supported by the same type of structure previously described and to which corresponding reference numerals have been applied. The tunnel conveyor chains 360 and 362 support blocks B, FIG. 14, and move the same through the tunnels, the weight of the blocks on the conveyor chains being supported by the H-beams 150 and plates 348. The conveyor chains in each tunnel 10 and 14 are about 5½ feet apart, which is good spacing for blocks a little over 8 feet long. The blocks may range in diameter from about 9 to 15 inches.

The tunnel side wall 302 and the intermediate wall 304 have members 364 and 366 embedded therein, which respectively support guide rails 368 and 370 to keep the blocks B spaced from the side walls of the tunnel 14. Similarly mounted guides 372 and 373 are mounted upon the dividing wall 304 and the right side wall 306, respectively, to guide the blocks B as they are moved through the tunnel 10. Spaced angle irons 374 and 376, FIGS. 14 and 15, have their opposite ends welded to the confronting plates 348, and sections of I-beams 378 are welded to the outer support plates 348. Pipes 380 are welded to the angle irons 376 and to the I-beam sections 378 and extend throughout the length of the tunnel 10. The pipes 380 form a grill-like structure (FIGS. 16 and 16A) between and on the outer sides of the tunnel conveyor chains 360 and serve to prevent the blocks B from falling into the spaces between the chains 360 and the tunnel side walls. The tunnel 14 includes a similar grill structure to which corresponding reference numerals have been applied. The angle irons 374 support steam distribution pipes, as will be described in detail hereinafter.

Referring to FIGS. 5 and 5A, the tunnel 10 is divided into four zones, respectively marked, Zone 1, Zone 2, Zone 3 and Zone 4. These zones are formed by a series of flexible flaps formed from "NEOPRENE," or the like, and are suspended from the ceiling of the tunnel. Thus, the entrance to Zone 1 is closed by a set of double flaps 382 connected by hinges 384 to plates 386 depending from the ceiling 308 of the tunnel. A flexible flap 388 extends into the space between the flaps 382 and is mounted upon a partition 390 secured to a channel 392 embedded in the floor 300. The flap 388 is secured at its lower end by bolts 394 to the partition 390. It will be noted that the flap 388 extends above the conveyor chain 360, being suitably notched for this purpose, and that the flaps 382 extend to a level close to the upper run of the conveyor chains 360. The flaps 382 and 384 are flexible and do not impede the blocks B as they are moved into the tunnel 10 on the chains 360.

A flap 396 forms a partition between Zones 1 and 2 and has a hinge 398 securing its upper end to a plate 400 depending from the tunnel ceiling 308. A lower flap 402 is secured to a partition 404 anchored in a manner similar to the partition 390. Similarly constructed and mounted flaps 406 and 408 form a partition between Zones 2 and 3, and flaps 410 and 412 form a parition between Zones 3 and 4. Like flaps 414 and 416 form a closure for Zone 4 at the discharge end of the tunnel 10. The tunnel 14 is likewise divided into four zones by cooperating flaps identified by corresponding reference numerals.

Referring to FIGS. 3 and 7, the space between the crowder decks 8 and 12 and the entrance to the tunnels 10 and 14 is abridged by four pairs of tail plates 418. The plates 418 are welded to the H-beam 350 the same as the upright supports 348, and are also welded to the channel 254 and the H-beam 210. The plates 418 are suitably slotted for the passage of the shafts 244 therethrough. The plates 418 also have short shafts 420 extending therethrough carrying idle sprockets 422 for the tunnel conveyor chains 360 and 362. The shafts 420 are mounted in bearings 423 carried by the plates 418, each pair of plates supporting one shaft 420.

Referring to FIGS. 3A, 17 and 18, a channel 424 is embedded in the tunnel floor 300 and twelve I-beams 426 have one end thereof welded to the channel 424, and the other end welded to an H-beam 428 of a frame work 430 of the transfer conveyor. A shaft 432 is journaled in bearings 434 mounted upon six of the I-beams 426. A pair of conveyor drive sprockets 436 is mounted upon the shaft 432 and are arranged to drive the tunnel conveyor chains 360.

The conveyor chains 360 are driven by a motor 438, FIG. 3A, having a sprocket drive connection 440 with a speed reducer 442. A sprocket 444 is mounted upon the output shaft of the speed reducer 442 and drives a sprocket 446 on the shaft 432 by a chain 448. A pneumatically operated clutch 450 is interposed in the shaft 432 between the sprocket 446 and the conveyor drive sprockets 436. The clutch 450 is actuated when it is desired to deliver a block from the tunnel 10, as will be described in detail later.

The conveyor chains 362 for the tunnel 14 extend around idle sprockets journaled in bearings supported by the tail plates 418 in the same manner as the sprockets 422 for the conveyor chains 360. The conveyor chains 362 are driven by a motor 438a in the same manner that the motor 438 drives the tunnel conveyor chains 360, and the parts corresponding to such drive have been identified by the same reference numerals, except that the clutch through which the drive is transmitted to the tunnel conveyor chains 362 is identified by the reference numeral 456. Thus, the tunnel conveyor chains 360 and 362 are independently driven, so that either tunnel 10 or 14 can be used without the other, if desired.

It will be understood that the blocks B are heated and saturated with hot vapor and water as they are moved through the tunnels 10 and 14 in a single crowded layer in a generally horizontal plane. Steam for such purpose is supplied by the vaporizing system 16, which includes a boiler 458. A main supply pipe 460, FIG. 21, extends from the boiler 458 and supplies heated fluid to the tunnels 10 and 14 through headers 462 and 464 respectively. The header 462 is connected with control units 466, 468, 470 and 472, which control the supply of heated fluid to Zones 1, 2, 3 and 4, respectively, of the tunnel 14. Similar control units 474, 476, 478 and 480, respectively, control the supply of heated fluid to the Zones 1, 2, 3, and 4, respectively of tunnel 10. The control units 466 through 480 are preferably of the type disclosed in Mortensen U.S. Pat. No. 3,448,530, which control the supply of steam to a steaming vault in accordance with variations in the temperature of the condensate leaving the vault. To this end, the tunnel side walls 302 and 306 each have a condensate outlet containing a temperature responsive sensor that controls the particular unit supplying steam to the corresponding zone of the tunnels. More specifically, the wall 302 has a condensate drain opening 482 adjacent to the tunnel floor 300, and which is located at a point about midway of the length of Zone 1 of tunnel 10 and empties into a condensate drainage trench 484, which extends for the full length of the tunnel 10. A correspondingly numbered trench extends for the full length of the tunnel 14.

The condensate trenches 484 increase in depth from the exit end of the tunnels 10 and 14 toward the entrance end and discharge through a down-pipe 483, FIG. 7, into a run-off trench 485 covered by a grate 487. In this connection, the tunnels 10 and 14 are about 140 feet long, but can be made shorter or longer to suit a given installation. The tunnels are about 10 feet wide and about 5½ feet from floor to ceiling, thus being very low.

The portion of the floor occupied by Zone 1 of tunnel 14 is sloped so that all condensate accumulated therein will flow by gravity toward the condensate outlet 482. A condensate temperature sensor 486 is mounted in the path of flow of the condensate and includes a thermally responsive element that is connected by wiring 488 to the control unit 466 to effect opening, modulation and closing of a control valve (not shown) in the unit, in the same manner described in the Mortensen U.S. Pat. No. 3,448,530. All other zones of the tunnels 10 and 14 include a similar condensate drain opening with condensate temperature sensors therein connected with the control units 468 to 480. In the interest of brevity, these parts have been identified by the same numerals applied to the corresponding parts of Zone 1. In addition, each zone of both tunnels 10 and 14 has a vapor temperature sensing device 491 mounted therein and connected by wiring 490 with the control unit for the corresponding zone.

The control unit 466 is connected by a pipe 492, to distribution pipes 494 and 496 located in Zone 1. The pipes 494 are attached to the ceiling by hangers 495 and each contains a series of nozzles 494a arranged to discharge downwardly onto blocks B being moved through the tunnel by the conveyors 360. The pipes 496 are detachably clamped to the angle irons 376, and have the nozzles 496a thereof directed upwardly against the lower portions of the blocks B carried by conveyors 360. Steam is supplied to Zone 1 under control of the unit 466 for a period determined by the condensate temperature sensor 486 and the vapor temperature sensor 491. Steam is supplied in a like manner to Zone 2 of tunnel 14 by a pipe 498 extending from the control unit 468 and having ceiling mounted branch pipes 500, and angle iron mounted pipes 502 for delivering heated vapor above and below the blocks under the control of the unit 468 and its associated temperature sensors 486 and 491. Similarly, heated vapor is supplied to Zone 3 of tunnel 14 through a pipe 504 connected with the control unit 470 and having ceiling branch pipes 506 and angle iron mounted pipes 508. The unit 472 supplies steam to Zone 4 of tunnel 10 through a pipe 510 connected with pipes 512 and pipes 514.

Heated vapor is supplied to Zones 1 to 4 of tunnel 10 under control of the units 474 to 480, in the same manner described in connection with the supply of steam to the zones of tunnel 14, and in the interest of brevity, the corresponding supply pipes have been identified by the same reference numerals.

After the heating and saturating treatment of the blocks B have been completed, they are ready for delivery to the veneer lathe 22. Treated blocks are delivered from the exit of the tunnels 10 and 14 to the lathe infeed deck 19 and lathe charger 20 by the block transfer conveyor 18. The details of this conveyor are best illustrated in FIGS. 17 to 20. The transfer conveyor 18 comprises the frame 430 which includes pairs of I-beam columns 522, 524, 526 and 528 anchored to a foundation 529 and being connected together at their upper ends by I-beam sections 530, 532, 534 and 536, respectively.

The I-beams 530 and 532 are interconnected by three transverse I-beams 538. The I-beams 532 and 534 are connected by I-beams 539 and the I-beams 534 and 536 are interconnected by I-beams 540. The two columns 524 are connected together by an I-beam 542, FIG. 18, and the columns 522 and 524 are connected by I-beams 544 and 544a. The I-beam 544a has cantilever I-beams 546 welded thereto to support a speed reducer 548. The columns 522, 524 and 526 nearest to the tunnels 10 and 14 have an I-beam 550 welded thereto and an electric motor 552 is mounted on the lower flange thereof. The shaft of motor 552 has a sprocket 554 mounted thereon, which drives a sprocket 556 on the input shaft 558 of the speed reducer 548 through a chain 560.

The speed reducer 548 has an output shaft 562 carrying a sprocket 564 that drives a larger sprocket 566, mounted on a shaft 568, through a chain 570. I beams 572 are welded between the I-beams 532 and 542 and have bearings 574 bolted thereto on one side thereof, in which the shaft 568 is mounted. A second sprocket 576 is mounted on the shaft 568 between the I-beams 572. A second shaft 578 is mounted in bearings 580 secured to the other side of the I-beams 572 and carries a sprocket 582. Short sections of I-beams 584 are welded to the opposite ends of the I-beam 530, FIG. 17. A plate 586 is welded to both of the I-beams 584 and bearings 588 are bolted to the plate 586. A shaft 590 is mounted in the bearings 588 and has a sprocket 592 mounted thereon.

Referring to FIG. 20, the I-beam 536 has short sections of I-beams 594 welded to the opposite ends thereof and a plate 596 is welded to the I-beams 594. Bearings 598 are bolted to the plate 596 and journal a shaft 600 having a sprocket 602 mounted thereon. An endless transfer conveyor chain 604 extends around the sprockets 592, 602, 576, 582 and forms a conveyor for transferring treated logs from the discharge end of the tunnels 10 and 14 to the lathe in-feed deck 19 and the lathe charger 20. The motor 552 is reversible to permit manual rejection of a given block at the transfer conveyor 18 and thus prevent delivery thereof to the lathe 22.

Referring to FIG. 18, the transfer conveyor 18 further comprises a trough 605 formed by downwardly and inwardly inclinded wall sections 606 and 608. The inner ends of the wall sections 606 and 608 are bent into an angle shaft forming vertical side wall portions 610 and 612, respectively, and horizontal flanges 614 and 616 which rest upon the transverse I-beams 530 to 536. A wear plate 618 overlies the flanged portions 614 and 616 and is engaged by the upper run of the conveyor 604. The wall sections 606 and 608 are further supported by plates 619 welded thereto and to the I-beams 530 to 536.

As will be readily understood, when the motor 552 is operating, it will drive the speed reducer 548, which, in turn, will drive the sprocket 566 on the shaft 568, and the sprocket 576 on the shaft 568 will drive the transfer conveyor chain 604. The sprocket 582 is an indler that can be adjusted to take-up excess slack in the conveyor chain 604.

Treated logs discharged from the tunnels 10 and 14 by the conveyor chains 360 and 362 are delivered to so-called "stop and loaders," one being provided for each tunnel and both being identical in construction. The function of the stop and loaders is to stop movement of a treated block after it has been delivered from either of the tunnels, and to subsequently load the block on to the transfer conveyor chain 604. A stop and loader for the tunnel 14 is generally identified by the numeral 622, FIGS. 17 and 18 and an identical stop and loader device for the tunnel 10 is generally identified by the numeral 620. Since both devices are identical, a description of one will suffice for both. Thus, the stop and loader 622 comprises an air-operated cylinder 624 that is pivotally connected by a pin 626 to a bracket 628 mounted upon the I-beam 550. A piston rod 630 extends from cylinder 624 and carries a clevis 632 that is pivotally connected by a pin 634 to an arm 636 keyed to a shaft 638. A second arm 640 is spaced along the shaft 638 from the arm 636 and is also keyed to the shaft. The arms 636 and 640 are disposed adjacent to and between the sprockets for the tunnel conveyor chains 360 and 362. Each of the arms 636 and 640 has an arcuate portion 642 to receive and support a block B as it leaves a tunnel conveyor chain. It will be noted from FIG. 18 that the arcuate portion 642 extends to a point 643 and provides a slight depression to readily accept a block from the tunnel conveyor chain 362. The trough wall 608 has a slot 644 aligned with each of the arms 638 and 640, so as not to interfere with counter-clockwise movement thereof.

The cylinder 624 has conduits 646 and 648 connected to the opposite ends thereof for supplying operating fluid to the cylinder to actuate the piston rod 630 to rotate the arms 636 and 640 counterclockwise as viewed in FIG. 18, whereby to load a block onto the wall 608 of the conveyor trough 605, so that it can roll down onto the transfer conveyor chain 604. The cylinder 624 is controlled by a solenoid valve 625 connected with the conduits 646 and 648, and can be controlled manually or automatically, as will be explained later. A solenoid valve 625a controls the cylinder 624a of the stop and loader 622.

A NO limit switch 645, FIG. 18A, is mounted so that it is held closed by engagement therewith of a shoulder 647 on the arm 636 when the arm is in position to accept a block from the tunnel conveyor chain 362. A NC switch 649, FIG. 18B, is mounted so that it is automatically opened by a block when received in the arms 636 and 640 of the stop and loader device 620. The switches 645 and 649 are connected in series in an electrical circuit (FIG. 23) to enable automatic operation of the clutch 450, as will be described later. The clutch 450 can also be manually controlled by a switch 651, FIG. 23. The switch 651, as well as the switches 645 and 649, are all connected with a solenoid operated valve 650, which is connected with an air supply header H, FIG. 22, and with a conduit 652 to control the supply and exhaust of operating fluid to the clutch 450.

The stop and loader device 622 is constructed and operates in identically the same manner to stop logs discharged from the tunnel 14 by the conveyor chains 362, and to load the blocks onto the transfer conveyor 604. Switches 645a and 649a, similar to the switches 645 and 649 are associated in like manner with the stop and loader 622 and control the clutch 456 through a solenoid operated valve 650a similarly connected to said clutch.

Referring to FIG. 18C, a NO limit switch 653 is mounted so that it is momentarily closed by the arm of the stop and loader 620 as it discharges a block onto the transfer conveyor 18. A similar NO limit switch 653a is likewise mounted to be momentarily closed by the arm 636 of the stop and loader 622. The purpose and function of the switches 653 and 653a will be described later.

The tunnel conveyor chains 360 and 362 are intermittently operated either manually or automatically, under the control of the solenoid valves 650 and 650a that actuate the clutches 450 and 456, respectively. These clutches can be engaged to drive the tunnel conveyor chains 360 and 362 whenever a treated log is to be removed from the tunnels 10 or 14 for ultimate delivery to the lathe charger 20.

Referring to FIG. 20, the transfer conveyor 18 has a delay type limit switch 654, similar to the switch 106, mounted at the far end thereof beyond the stop and loader 620. Limit switch 654 is mounted in a housing 656 and has a projecting plunger 658 that is contacted by a flap plate 660 hinged to the housing at 662 and actuated by a block as the transfer conveyor chain 604 moves the block into engagement with the plate 660. The limit switch 654 actuates a solenoid valve 664 that controls the supply and exhaust of operating fluid to a cylinder 666 of a transfer conveyor kicker device 64b similar to the kicker devices 64 and 64a. Thus, referring to FIGS. 17 and 19, an I-beam 668 is connected between the columns 526 and 528 and carries a bracket 670, upon which the lower end of the cylinder 666 is pivotally mounted. A piston rod 672 extends from the cylinder 666 and is pivotally connected by a pin 674 to a plate 676 similar to the plate 76. The plate 676 is welded to a pipe 678, which in turn is welded to gusset plates 679 attached to a pair of kicker arms 680 mounted on a rod 682. The rod 682 is journaled in brackets 684 bolted to the columns 526 and 528. The kicker arms 680 are movable by the cylinder 666 from the position shown in full lines, FIG. 19, to that shown in dot-and-dash lines. During such movement, the kicker arms 680 pass through openings 686 in the conveyor trough wall 608.

It will be noted from FIG. 19, that the limit switch 654 is directly in the path of a block while being conveyed by the transfer conveyor chain 604. Accordingly, as the block engages the pivoted plate 660, the limit switch 654 is automatically actuated and closes a circuit to the solenoid operated valve 664 to actuate the cylinder 666 to automatically move the kicker arms 680 to kick a block out of the trough 605 of the transfer conveyor 18 onto the lathe in-feed deck 19. If desired, the clutches 450 and 456 that are engageable to drive the tunnel conveyor chains 360 and 362, can be automatically operated by the limit switch (described later) at the lathe charger 20, which is actuated as a block is delivered to the veneer lathe 22. In this manner, blocks can be continuously, automatically and alternately removed from the tunnels 10 and 14 and delivered to the lathe charger 20, as will appear more fully hereinafter.

An electrical circuit for manually and/or automatically controlling most of the foregoing elements is shown in FIG. 23. Electrical current for actuating the various components of the circuit is supplied through main conductors 690 and 692. A NO manually operable START switch 694 is connected across the conductors 690 and 692 in series with the reversible motor 552, which drive the chain 604 of the transfer conveyor 18. A relay 696 having normally closed contacts is connected between the motor 552 and the conductor 692. A NC STOP switch 698 is connected between the conductor 690 and the START switch 694. The transfer conveyor 18 normally runs continuously, but the switch 698 is manually operable to cut off current to interrupt operation at any time.

A kicker switch 700 controls the circuit to the solenoid valve 654 for actuating the kicker 646. The kicker switch 700 has an intermediate position which is the OFF position, a MANUAL or hand operating position, and an AUTO (automatic) operating position, indicated by corresponding legends in FIG. 23. A wire 702 connects the conductor 690 to a common contact 704 of the switch 700. A manual contact 706 is connected by a wire 708 to one end of a coil 710 of the solenoid valve 654, the other end of the coil being connected by a wire 712 with the conductor 692. An "automatic" contact 714 of the switch 700 is connected in shunt relation to the wire 708 by a wire 715 including the NO delay limit switch 654, which is closed by a block striking the flap gate 660. It will be apparent that when the arm of switch 700 is engaged with the contact 706, the solenoid valve 664 controlling the kicker device 64b can be actuated independently of the switch 654, and that when the arm of switch 700 is engaged with the contact 714, the solenoid valve 664 will be automatically actuated whenever the switch 654 is closed by a block on the transfer conveyor 18.

The motor 438 which drives the tunnel conveyor chains 360 in tunnel 10 is controlled by a START switch 716. One side of the switch 716 is connected to one side of the motor 438 by a wire 718, and the other side of the motor 438 is connected by a wire 720, having a NC relay 722 connected therein, to the conductor 692. A STOP switch 724 is connected between the conductor 690 and the switch 716 by a conductor 726. Upon operation of the START switch 716, the motor 438 will be started and run continuously to provide a drive for the clutch 450, which drives the conveyor chains 360 in tunnel 10. Depressing the STOP switch 724 will, of course, interrupt operation of the drive means for the conveyor chains 360.

The clutch 450 which transmits the drive from the motor 438 to the tunnel conveyor chains 360 can be manually or automatically controlled by the switch 651. This switch has a MANUAL, OFF and AUTO (automatic) position. A manual contact 730 is connected by a conductor 732 to one end of a coil 734 of the solenoid valve 650. The other side of the coil 734 is connected by a wire 736 to the conductor 692. An automatic contact 738 is connected in shunt with the wire 732 by a conductor 739. The limit switches 645 and 649 are connected in series in the conductor 739. A wire 741 connects the conductor 690 to a common contact 743 of the switch 651. Accordingly, when the arm of the switch 651 is engaged with the contact 730, the solenoid valve 650 is manually controlled to actuate the clutch 450 to drive the tunnel conveyor chains 360. When the switch arm is engaged with the contact 738, the valve 650 is automatically actuated when the NO switch 645 is closed by the stop and loader 620 being in a position to accept a block from the conveyor (FIG. 18A).

The motor 438a for driving the clutch 456 connected with the tunnel conveyor chains 362 is controlled by a START switch 740. One side of the switch 740 is connected by a wire 742 to one side of the motor 438a and the other side of the motor is connected by a wire 744, containing a NC relay 746, to the conductor 692. The other side of the switch 740 is connected to the conductor 690 by a line 748 having a STOP switch 750 connected therein. Upon closing of the switch 740, the motor 438a will be started and run continuously until the STOP switch 750 is actuated to open the circuit thereto. The clutch 456, which transmits a drive from the motor 438a to the tunnel conveyor chains 362 can be manually or automatically actuated, in accordance with the position of a switch 752.

The switch 752 has a MANUAL, OFF and an AUTO (automatic) position. A manual contact 754 is connected by a conductor 756 with one end of a coil 758 of the solenoid operated valve 650a. The other side of the coil is connected by a conductor 760 to the main conductor 692. An automatic contact 762 is connected by a shunt line 764 with the conductor 756 and has connected in series therein the NO switches 645a and the NC switches 649a. A wire 763 connects the conductor 690 with a common contact 767 of the switch 752. It will be apparent that when the arm of the switch 752 is engaged with contact 754, solenoid valve 650a is manually controlled to energize the clutch 456 to drive the tunnel conveyor chains 362. When the arm of the switch 752 is engaged with the contact 762, the solenoid valve 650a will be automatically actuated when the stop and loader 622 is in position to accept a block from the conveyor chains 362 and the NO switch 645a is closed.

The stop and loaders 620 and 622 can be either manually or automatically controlled. Thus, a NO limit switch 765, FIGS. 1 and 23, that is actuated momentarily by the lathe charger 20, has a common contact 766 that is connected by a wire 768 with the main conductor 690. The stop and loader 620 is controlled by a double pole switch 770 that has a MANUAL, OFF and AUTO (Automatic) positions as indicated. A manual contact 772 is connected by a conductor 774 to one side of a coil 776 of the solenoid valve 625, and the other side of the coil is connected by a conductor 778 with the main conductor 692. An automatic contact 780 is connected in series with NC contacts 779 of a relay CR1 and NO contacts 781 of a relay CR2 by a conductor 782 in shunt with the conductor 774. Accordingly, when the switch 770 is actuated to engage the contact 772, and a block is in the stop and loader 620, the solenoid valve 625 is manually energized to actuate the stop and loader 620 to transfer the block onto the conveyor chain 604 of the transfer conveyor 18. When the switch 770 is engaged with the contact 780, and the switch 765 is momentarily closed by the lathe charger 20, the solenoid valve 625 will be automatically actuated to transfer the block to the conveyor 18.

The stop and loader 622 can be manually or automatically controlled by a switch 784, similar to the switch 770. Thus, when the switch 784 is engaged with a manual contact 786, the circuit to the solenoid operated valve 625a is completed through a wire 785 connected to one end of the solenoid coil 787, the other end of which is connected by wire 789a to the conductor 692, the stop and loader 622 will be actuated. When the switch 784 is engaged with an automatic contact 788, and the limit switch 785 is closed by the lathe charger 20, the solenoid valve 625a will be automatically actuated to operate the stop and loader 622 to transfer a log from the arms 636 and 640 onto the transfer conveyor chain 604. The contact 788 is connected in a shunt line 790, having NO contacts 789 of relay CR1 and NC contacts 791 of relay CR2 connected therein in series.

The control relays CR1 and CR2 associated with the control means for the stop and loaders 620 and 622 are connected in parallel and have current supplied thereto from the conductor 690 through a line 792. A conductor 794 is connected to control relay CR1 and has a set of NC contacts 793 of CR2 and NO contacts 795 of CR1 connected therein in series. The other side of the relay CR1 is connected by a line 796 with the main conductor 692. The NO limit switch 653 is connected in a line 798 arranged in shunt with the conductor 794. The limit switch 653 is closed momentarily by the stop and loader 620 discharging a block onto the transfer conveyor 18, as stated above.

Control relay CR2 is connected with the conductor 792 by a conductor 800 having the NO limit switch 653a connected therein. A conductor 802 is connected in shunt with limit switch 653a and is connected in series with NO contacts 799 of control relay CR2 and NC contacts 801 of control relay CR1. The switch 653a is closed momentarily by the stop and loader 622 discharging a block onto the transfer conveyor 18, as previously pointed out.

The present system is designed to supply a veneer lathe with blocks at the same rate at which they are being cut into veneer, while allowing the blocks to be equally heated in the steam tunnels 10 and 14 for a maximum period of time, The loading of the blocks into the tunnels 10 and 14 is under manual control; whereas, the movement of the logs through the tunnels and delivery thereof to the lathe charger 20 can be controlled either manually or automatically.

Thus, the input conveyor 4 can be started and stopped, as desired, by manually operating the switch 60. The crowder deck conveyors 234 and 278 run continuously and are manually started by energizing the motors 260. The barker 2 supplies bark-free logs to the input conveyor 4 and these can be cut to appropriate block size by the saw 6. The input conveyor chain 54 then carries the block to engage either the limit switch 106 at the end of the conveyor to be kicked by the input kicker 64 onto the crowder deck 8, or the stop arm 114 can be actuated to an obstructing position to beengaged by the block and actuate the limit switch 142 to operate the input kicker 64a to kick the block onto the crowder deck 12. The crowder conveyor chains 234 and 278 then deliver the blocks to the tunnel conveyor chains 360 and 362, respectively. Both crowder decks 8 and 12 can be filled with logs before the tunnel conveyors 360 and 362 are started. The debarked logs are slippery so that, while the crowder conveyors travel at a speed of about 15 feet per minute, which is faster than that of the tunnel conveyors, the crowder conveyors can "slip" relative to the blocks without damaging the blocks. The tunnel conveyors 360 and 362 are started by closing the switches 651 and 752 to effect engagement of the clutches 450 and 456, respectively, which drive said conveyors at a speed of about 3 feet per minute. The crowding of the blocks assures that a maximum amount of blocks in introduced into and maintained in the tunnels 10 and 14. The block condition system is placed in operation as soon as the blocks enter the tunnels 10 and 14 to heat and saturate the same.

Enough blocks are introduced into the tunnels 10 and 14 to fill Zone 1 thereof, and are allowed to remain there for about 30 minutes or until the condensate temperature for the zone reaches a prescribed value for the particular species of wood being treated. The tunnel conveyors 360 and 362 are then restarted and more blocks are moved into the tunnels 10 and 14 from the crowder decks 8 and 12, until Zones 1 and 2 are filled. After the blocks moved into Zone 2 have been properly conditioned, more blocks are moved into the tunnels until all zones have been filled and the first-introduced blocks are completely conditioned and ready to be peeled. The conditioning of a block can be effected in about 2 hours from the time it enters a tunnel until the time it is ready to be removed, employing the method based on condensate temperatures in the respective zones described hereinabove.

It is preferable to load the lathe infeed deck 19 with treated logs before operating the lathe charger 20 to load a block onto the lathe 22. This can be readily done under manual control by operating the switch 651 to effect engagement of the clutch 450 to drive tunnel conveyor 360 to deliver a block to the stop and loader 620 and then operating the switch 770 to actuate the stop and loader 620 to load the block onto the transfer conveyor 18. The transfer kicker 64b will then be automatically actuated by the block closing limit switch 645 to kick the block off the transfer conveyor 18 and onto the lathe infeed deck 19.

Another block can be removed in the same manner from the tunnel 14 by operating the switches 752 and 784 to start the conveyor 362 and to actuate the stop and loader 622 to load a block onto transfer conveyor 18 to be kicked onto the lathe infeed deck 19.

By repeating the foregoing operations, blocks can be alternately removed from the tunnels 10 and 14 and delivered to the charger infeed deck 19 until the deck is loaded to the extent desired. The operator then manually actuates the lathe charger 20 to position a block in the lathe 22.

It will be understood that the limit switches controlling the kickers 64, 64a and 64b, and the stop and loaders 620 and 622 keep the solenoid valves associated therewith energized long enough for the kickers 64–64a and 64b to kick the blocks off the input conveyor 4 and transfer conveyor 18, respectively, and for the stop and loaders 620 and 622 to unload the blocks onto the transfer conveyor 18.

After the apparatus has been placed in operation under manual control it can be set for automatic control, which is preferable with respect to the cycle continuing from the time the blocks are delivered to the tunnels 10 and 14.

The operation of the automatic controls for handling the blocks while passing through the tunnels 10 and 14 and for delivering the same to the charger infeed deck 21, is as follows:

Assuming that tunnel 14 was the last to discharge a block; that both stop and loaders 620 and 622 are discharged; and that all selector switches 700, 651, 752, 770, and 784 are connected in the AUTO or automatic mode. In discharging the last block onto the transfer conveyor 18, the stop the loader 622 will momentarily close the NO switch 653a. This energizes the control relay CR2, closing its normally open contacts 781 and 799 and opening its NC contacts 791 and 793 thereby "sealing in" control relay CR2 and "sealing out" solenoid valve 625a of the stop and loader 622. The control relay CR1 is de-energized at this time.

When the lathe operator again charges the lathe 22, the lathe charge 20, in charging the lathe, momentarily closes the NO limit switch 765 which in turn, actuates the stop and loader 620 by energizing the solenoid valve 625 through the NC contacts 779 of relay CR1, and the NO, but now closed, contacts 781 of CR2. In discharging the block, the stop and loader 620 closes the NO limit switch 653. This energizes the control relay CR1, closing the NO contacts 789 and 795 and opening its NC contacts 779, 795 thereby "sealing in" control relay CR1 and "sealing out" solenoid valve 625 of the stop and loader 620.

When the stop and loader 620 returns to the position in which it can accept a block, (FIG. 18A) limit switch 645 will be held closed and limit switch 649 will also be closed due to the absence of a block in the stop and loader 620. Solenoid valve 650 will be energized through the two limit switches 645 and 649, to engage the clutch 450 to drive the tunnel conveyor chains 360 of tunnel 10 until a block B enters the stop and loader 620 and opens the limit switch 649. This automatically deenergizes the solenoid valve 650 and clutch 450 and the conveyor 360 stops.

When the operator again charges the lathe 22, the charger 20 again closes limit switch 765 momentarily, which this time actuates stop and loader 622 by energizing the solenoid valve 625a through the NC closed contact 791 of CR2 and the NO, but now closed contact 789 of CR1. In discharging the block, the stop and loader 622 closes limit switch 653a. This energizes control relay CR2, closing its normally open contacts 781 and opening the NC contacts 791 and "sealing in" control relay CR2 and "sealing out" solenoid valve 625a of stop and loader 622 and de-energizing control CR1. When the stop and loader 622 returns to the position in which it can accept a block, the limit switch 645a will be held open and limit switch 649a will be closed due to the absence of a block in the stop and loader 622. The solenoid valve 650a will be energized through the limit switches 645a and 649a to actuate clutch 456 to engage and drive the conveyor chains 362 in the tunnel 14, until a block enters the stop and loader 622 and opens limit switch 649a. This de-energizes the solenoid valve 650a, the clutch 456 is disengaged and the conveyor 362 stops.

The next time that the lathe 22 is charged, the stop and loader 620 will be actuated, starting the cycle again of alternately removing treated blocks from the tunnels 10 and 14 and supplying the same to the transfer conveyor 18 for delivery to the lathe charger deck 19. Thus, the operation is automatic and continuous with respect to removing blocks from the tunnels 10 and 14 and delivering them to the lathe 22.

It will be understood that various changes may be made in the design of the tunnels, conveyors and in the electrical control circuit disclosed herein, without departing from the principles of the invention or the scope of the annexed claims.

We claim:

1. In a method of heating and saturating wood blocks in an elongated enclosed area to condition the same for cutting into veneer, the steps comprising: introducing, supporting and moving blocks through the enclosed area; and subjecting the blocks while in said enclosed area to appropriate amounts of steam of high moisture content to progressively heat and saturate the blocks sufficiently to render the same suitable for cutting into veneer by the time that the blocks leave the enclosed area.

2. The method defined in claim 1, including the step of: moving the blocks through the enclosed area in a single layer.

3. The method defined in claim 1, including the step of: directing jets of steam simultaneously against the blocks from above and below the same.

4. The method defined in claim 1, including the step of: maintaining the blocks crowded against each other while they are being moved through the enclosed area.

5. The method defined in claim 1, including the step of: crowding the blocks against each other prior to introduction into the enclosed area.

6. The method defined in claim 1, including the steps of: crowding the layer of blocks against each other prior to introduction into the enclosed area; and maintaining the blocks crowded together while moving them through the enclosed area.

7. The method defined in claim 1, including the steps of: removing the treated blocks from the enclosed area one at a time, and delivering the blocks to a lathe charger.

8. The method defined in claim 2, including the steps of: maintaining the blocks crowded against each other while they are being moved through the enclosed area; removing the treated blocks one at a time from the enclosed area; and delivering the treated blocks to a lathe charger.

9. The method defined in claim 2, including the steps of: providing at least one additional elongated enclosed area and supporting and moving a single layer of blocks through at least said one additional enclosed area; subjecting the blocks while in said additional enclosed are to appropriate amounts of steam of high moisture content to progressively heat and saturate the blocks sufficiently to render the same suitable for cutting into veneer by the time the blocks leave said additional enclosed area; and removing the treated blocks one at a time alternately from the enclosed area.

10. The method defined in claim 9, including the steps of: delivering the removed blocks to a lathe charger to be successively positioned in a veneer lathe; and removing a treated block from one or the other of the enclosed areas each time that a block is positioned in the lathe.

11. The method defined in claim 1, including the step of: dividing the elongated enclosed area lengthwise into a plurality of successive zones; and subjecting the blocks while in said zones to appropriate amounts of steam to impart a predetermined temperature and saturation thereto for each given zone.

12. The method defined in claim 11, including the step of: draining condensate from each zone; and delivering steam to the separate zones in predetermined amounts corresponding to the temperature of the condensate draining from the respective zones.

13. Apparatus for handling and conditioning wood blocks to be cut into veneer, comprising: an elongated treating tunnel having an entrance and an exit; a tunnel conveyor within said tunnel for receiving blocks, moving the blocks through said tunnel, and discharging the blocks at the exit of said tunnel; and means driving the tunnel conveyor including means operable for effecting intermittent movement of said tunnel conveyor for intermittently discharging said blocks from said tunnel.

14. Apparatus as defined in claim 13, including means arranged to continuously deliver blocks to the entrance to the tunnel for further conveyance by the tunnel conveyor.

15. Apparatus as defined in claim 13, including means for delivering blocks to the tunnel conveyor in a single layer.

16. Apparatus as defined in claim 15, wherein the tunnel conveyor moves the blocks through the tunnel in a single layer; and wherein the tunnel has means for heating and saturating the blocks with moisture while being so moved.

17. Apparatus as defined in claim 13, including means dividing the tunnel into a plurality of separate zones; and means separately heating and controlling the temperature in each zone.

18. Apparatus as defined in claim 13, wherein the means operable to effect intermittent movement of the tunnel conveyor is a clutch.

19. Apparatus as defined in claim 18, wherein the clutch is fluid pressure operated; a solenoid-operated valve connected with said clutch to control the flow of operating fluid thereto; control means for said solenoid-operated valve including a switch connected with said solenoid-operated valve to energize the same to thereby effect engagement of said clutch.

20. Apparatus as defined in claim 19 including a transfer conveyor adjacent the discharge end of the tunnel conveyor; means arranged to drive said transfer conveyor, a stop and loader device disposed between the tunnel conveyor and the transfer conveyor for receiving a block from the tunnel conveyor and moving said block onto the transfer conveyor; means connected with said stop and loader device for operating the same; a NO switch positioned to be held closed by the stop and loader device when in a position to accept a block from the tunnel conveyor; a NC switch positioned to be opened by the block after it is received in the stop and loader device, said NO and NC switches being connected in series and with the solenoid-operated valve; and wherein the switch is manually operable and has an "automatic" position wherein it is connected in series with said NO and NC switches, whereby the circuit to the solenoid-operated valve controlling the clutch is automatically completed upon the reception of a block in the stop and loader device.

21. Apparatus as defined in claim 15, wherein the means for delivering blocks to the tunnel conveyor includes a crowder conveyor for crowding the blocks against each other; and means for continuously driving the crowder conveyor at a speed greater than the speed at which the tunnel conveyor travels, whereby to crowd the blocks against each in advance of the tunnel entrance and to maintain the blocks crowded against each other on the tunnel conveyor.

22. Apparatus as defined in claim 21, in which the crowder conveyor has a receiving end; and a block input conveyor is positioned transversely to said crowder conveyor and adjacent to said receiving end for delivering blocks to said crowder conveyor; means for driving said input conveyor; and means operable to remove a block from the input conveyor and to deposit the same upon the crowder conveyor.

23. Apparatus as defined in claim 22, including manually operable means controlling the operation of the block input conveyor.

24. Apparatus as defined in claim 22, in which the means for removing the block from the input conveyor and depositing the same on the crowder conveyor includes a kicker device comprising arms having ends for engaging a block and kicking it off the input conveyor onto the crowder conveyor; a fluid pressure operated cylinder connected to actuate said arms; a solenoid-operated valve connected with said cylinder and controlling the supply and exhaust of operating fluid to said cylinder; and NO switch means connected with said solenoid-operated valve and being operable to energize said solenoid valve.

25. Apparatus as defined in claim 24, wherein the switch means is mounted on the input conveyor in the path of movement of a block being carried by said input conveyor; and wherein the switch means is actuated by a block being conveyed on said input conveyor for energizing the solenoid-operated valve and effecting automatic operation of the kicker device.

26. Apparatus as defined in claim 24, in which a block-stop device is mounted transversely to the input conveyor and comrpises a housing, a stop arm slidably supported in said housing so that it can be moved to a position to obstruct a block on the input conveyor, said stop arm having clearance in said housing allowing limited sidewise movement thereof in said housing, and wherein the switch means is mounted on said housing so as to be actuable to close by sidewise movement of said stop arm upon engagement of a block with said stop arm, an operating cylinder connected with said stop arm, a solenoid-operated valve connected to control the supply and exhaust of operating fluid to said cylinder, and a manually operable control switch connected with said solenoid-operated valve.

27. Apparatus as defined in claim 13, including a transfer conveyor located at the exit of the tunnel for receiving blocks one at a time from the tunnel conveyor; means connected to drive said transfer conveyor; a stop and loader device disposed between the the discharge end of the tunnel conveyor and the transfer conveyor operable to transfer a block, delivered thereto by the tunnel conveyor, onto the transfer conveyor; and control means operable for actuating said stop and loader device to effect the loading of the block received from the tunnel conveyor onto the transfer conveyor.

28. Apparatus as defined in claim 27, in which the drive means for the transfer conveyor includes a reversible electric motor, whereby the transfer conveyor can be reversed in direction to reject a block that has been delivered thereto.

29. Apparatus as defined in claim 27, wherein the stop and loader device comprises a pair of arms for receiving a block from the tunnel conveyor; means connected with said arms for actuating the same including a fluid pressure operated cylinder, a solenoid-operated valve connected with said cylinder for controlling the supply and exhaust of operating fluid thereto; and wherein the control means for the stop and loader device includes a switch connected with and controlling said solenoid-operated valve.

30. Apparatus as defined in claim 29, wherein the switch can be manually actuated to energize the solenoid-operated valve to operate the stop and loader device.

31. Apparatus as defined in claim 27, wherein the control means for the solenoid-operated valve is automatic and includes a NO switch that is held closed by the stop and loader while in a position to accept a block from the tunnel conveyor.

32. Apparatus as defined in claim 27, wherein the control means for the solenoid-operated valve is automatic and includes a NC switch that is held open by a block in the stop and loader.

33. Apparatus as defined in claim 27, wherein the control means for the solenoid-operated valve includes a NO switch that is held closed by the stop and loader while in a position to accept a block from the tunnel conveyor, and a NC switch that is held open by a block in the stop and loader, said switches being connected in a circuit in series with each other and with the solenoid-operated valve, and wherein the manual switch can be actuated to an "automatic" position in series with said NO and NC switches to enable automatic control of the stop and loader device, said manual switch when in a "manual" operating position being connected in shunt relation to said NO and NC switches.

34. Apparatus as defined in claim 33, including a NO switch connected in the circuit that is momentarily energized by the stop and loader during discharging of a block therefrom.

35. Apparatus as defined in claim 33, wherein the manually operated switch has an "automatic" position for enabling the stop and loader device to be automatically operated; and wherein a control relay and a NO switch are connected in a circuit with the manual-automatic switch and the solenoid-operated valve, said NO switch being arranged to be held closed momentarily by the stop and loader device during discharging of a block therefrom onto the transfer conveyor.

36. Apparatus as defined in claim 35, including an infeed deck; a lathe; a lathe charger; and a NO limit switch momentarily actuated by the lathe charger in positioning a block in the lathe connected in circuit with the control relay and the NO switch for energizing the solenoid-operated valve to operate the stop and loader to supply a block to the transfer conveyor as another block is being positioned in the lathe.

37. Apparatus as defined in claim 36, wherein a kicker device is mounted relative to the transfer conveyor at the infeed deck of the lathe charger, said kicker device including a pair of arms having ends for engaging a block and kicking it off the transfer conveyor onto the infeed deck, said kicker device further including a fluid pressure operated cylinder connected with said arms; a solenoid operated valve connected with said cylinder controlling the supply and exhaust of said operating fluid to said cylinder; a limit switch located in the path of travel of said transfer conveyor and being operable by a block being conveyed by said transfer conveyor, said switch being connected in a circuit with said solenoid-operated valve for automatically actuating said kicker device upon actuation of said limit switch by engagement therewith of a block on the transfer conveyor.

38. Apparatus for treating wood blocks to condition the same to be cut into veneer, comprising: a plurality of tunnels each having an entrance and an exit; a conveyor in each of said tunnels for moving a layer of blocks therethrough while being treated; independent drive means driving said tunnel conveyors; and a separately operable clutch connected with each drive means for independently controlling the operation of said tunnel conveyors.

39. Apparatus as defined in claim 38, wherein the clutches are pneumatically operable and a solenoid-operated valve is connected with each of the clutches to energize the same; and a switch connected in circuit with each of the solenoid-operated valves and being operable to actuate the clutches as desired.

40. Apparatus as defined in claim 38, in which the tunnels are arranged parallel with each other, a transfer conveyor located at the exit end of said tunnels; means including a stop and loader device associated with said transfer conveyor and with each tunnel for receiving blocks one at a time from said tunnels; and means for automatically operating said stop and loader devices.

41. Apparatus as defined in claim 38, including an input conveyor for supplying blocks to the tunnels; the crowder conveyor between the input conveyor and one of the tunnels; a NO limit switch located adjacent to said crowder conveyor and being arranged to be operable by a block on the input conveyor; and a first kicker device including an opeating cylinder and a solenoid-operated control valve connected with said cylinder and with said switch, for automatically kicking a block off the input conveyor onto said crowder conveyor.

42. Apparatus as defined in claim 41, including a second crowder conveyor between the input conveyor and another of said plurality of tunnels; a stop arm mounted on the input conveyor adjacent to the second crowder conveyor; manually controlled means operable to cause said stop arm to assume a position obstructing movement of a block on the input conveyor; a NO switch arranged to be closed by movement of the stop arm when engaged by a block; a second kicker device similar to the first kicker device for kicking a block off the input conveyor and onto the second crowder conveyor; and a second solenoid-operated valve connected in circuit with the switch actuated by said stop arm for energizing said solenoid valve and automatically operating said second kicker device.

43. Apparatus as defined in claim 42, including guide means alongside the crowder conveyors and guiding the blocks while enroute to the entrance to the respective tunnels.

44. Apparatus for handling and conditioning wood blocks to be cut into veneer, comprising: an input conveyor for conveying blocks to be treated; manually controlled means driving said input conveyor; a plurality of crowder decks arranged side-by-side and at right angles to said input conveyors and having one end thereof adjacent to said input conveyor; means arranged to transfer blocks from said input conveyor onto the respective crowder decks; a crowder conveyor in each of said crowder decks having a receiving end to receive blocks from said input conveyor and also having a discharge end; means connected with each crowder conveyor for driving the same; a plurality of tunnels, one in line with each of said crowder conveyors, said tunnels having an entrance adjacent to the discharge end of said crowder conveyors and having an exit; a tunnel conveyor in each of said tunnels having a receiving end for receiving blocks from its respective crowder conveyor and having a discharge end for discharging blocks from said tunnels; means for intermittently and independently driving said tunnel conveyors at a speed less than the speed of said crowder conveyors; means in said tunnels for heating and saturating the blocks with moisture to condition the same to be cut into veneer while in transit through said tunnels; a stop and loader device at the exit of each of said tunnels arranged transversely to said tunnel conveyors to receive a block from the discharge end of said tunnel conveyors; a transfer conveyor arranged at right angles to the tunnel conveyors and paralle with said stop and loader devices, said transfer conveyor having a discharge end; means driving said transfer conveyor; said tunnel conveyor drive means including electrically actuated control elements; means for actuating the particular stop and loader device that has received a block from a given tunnel conveyor to cause said stop and loader device to transfer said block to said transfer conveyor; a lathe infeed deck located adjacent to the discharge end of said transfer conveyor; means arranged to move a block off the transfer conveyor onto the infeed deck; a lathe; a lathe charger arranged to receive a block from the infeed deck and to position said block in said lathe; means including a limit switch actuated by movement of said lathe charger in positioning a block in said lathe connected in circuit with said electrically operated control elements of said tunnel conveyor drive means for effecting operation of the tunnel conveyor driving means for discharging a block from successive tunnels each time that said lathe charger positions a block in said lathe.

* * * * *